United States Patent
Takeda et al.

(10) Patent No.: US 12,348,450 B2
(45) Date of Patent: Jul. 1, 2025

(54) TECHNIQUES FOR DIRECT SECONDARY CELL ACTIVATION USING TEMPORARY REFERENCE SIGNALS

(71) Applicant: QUALCOMM Incorporated, San Diego, CA (US)

(72) Inventors: Kazuki Takeda, Tokyo (JP); Changhwan Park, San Diego, CA (US); Punyaslok Purkayastha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 17/894,875

(22) Filed: Aug. 24, 2022

(65) Prior Publication Data

US 2023/0136589 A1    May 4, 2023

Related U.S. Application Data

(60) Provisional application No. 63/272,977, filed on Oct. 28, 2021.

(51) Int. Cl.
*H04L 5/00* (2006.01)
*H04W 24/08* (2009.01)

(52) U.S. Cl.
CPC .......... *H04L 5/0051* (2013.01); *H04L 5/0053* (2013.01); *H04L 5/0096* (2013.01); *H04W 24/08* (2013.01)

(58) Field of Classification Search
CPC ..... H04L 5/0048; H04L 5/0051; H04L 5/003; H04L 5/0053; H04L 5/0091;
(Continued)

(56) References Cited

U.S. PATENT DOCUMENTS 12,010,639 B2 *   6/2024  Yang .................... H04W 56/001
2021/0058215 A1 *  2/2021  Si ............................ H04L 5/001
(Continued)

FOREIGN PATENT DOCUMENTS

WO     WO-2021003678 A1     1/2021

OTHER PUBLICATIONS

CATT: "Discussion on Efficient Activation and De-Activation Mechanism for SCell in NR CA", 3GPP TSG RAN WG1 Meeting #102-e, R1-2005698, 3rd Generation Partnership Project, Mobile Competence Centre, 650, Route Des Lucioles, F-06921 Sophia-Antipolis Cedex, France, vol. RAN WG1, No. e-Meeting, 20200817-20200828, 3 Pages, Aug. 8, 2020, XP051917673, p. 1, paragraph 2, p. 3, paragraph 2, figures 1, 2.

(Continued)

*Primary Examiner* — Warner Wong
(74) *Attorney, Agent, or Firm* — Holland & Hart / QUALCOMM Incorporated

(57) ABSTRACT

Methods, systems, and devices for wireless communications are described. A user equipment (UE) may be configured to receive, via a first serving cell, a message including an indication to activate a second serving cell different from the first serving cell. The UE may receive, via the first serving cell, a control message indicating a first resource for transmitting a response message responsive to the message, and triggering a reference signal associated with time and frequency tracking for the second serving cell. The UE may transmit, via the first serving cell and within the first resource indicated via the control message, the response message acknowledging the message. The UE may then monitor a second resource of the second serving cell for the reference signal based on the control message.

28 Claims, 19 Drawing Sheets

(58) Field of Classification Search
CPC ............... H04L 5/00966; H04L 27/261; H04L 2025/03783; H04L 7/00; H04L 7/10; H04L 12/2856; H04W 24/08; H04W 36/0061; H04W 84/042; H04W 56/00; H04W 56/001; H04W 60/00; H04W 76/00; H04W 76/15

See application file for complete search history.

(56) References Cited

U.S. PATENT DOCUMENTS

| | | | | |
|---|---|---|---|---|
| 2021/0068129 | A1* | 3/2021 | Ryu | H04W 56/001 |
| 2021/0111851 | A1* | 4/2021 | Lin | H04W 24/10 |
| 2021/0251040 | A1* | 8/2021 | Tang | H04W 24/10 |
| 2022/0131669 | A1* | 4/2022 | Takeda | H04L 5/0048 |
| 2022/0166538 | A1* | 5/2022 | Miao | H04L 5/0098 |
| 2022/0217800 | A1* | 7/2022 | Zhang | H04W 76/15 |
| 2022/0271899 | A1* | 8/2022 | Hsieh | H04W 72/20 |
| 2022/0330061 | A1* | 10/2022 | Zewail | H04L 5/0053 |
| 2023/0237126 | A1* | 7/2023 | Raman | G06F 18/2148 706/12 |
| 2024/0080169 | A1* | 3/2024 | He | H04L 5/0048 |
| 2024/0188089 | A1* | 6/2024 | He | H04L 5/0098 |
| 2024/0188168 | A1* | 6/2024 | Takeda | H04L 5/0055 |
| 2024/0214174 | A1* | 6/2024 | He | H04W 52/0235 |
| 2024/0381405 | A1* | 11/2024 | Babaei | H04W 72/27 |

OTHER PUBLICATIONS

International Search Report and Written Opinion—PCT/US2022/075465—ISA/EPO—Nov. 29, 2022.

Mediatek Inc: "Efficient and Low Latency SCell Data Transmission for NR CA", 3GPP TSG RAN WG1 Meeting RAN1 #98-Bis, R1-1911062, Efficient and Low Latency Scell Data Transmission for Nr Ca_20191004_Final, 3rd Generation Partnership Project, Mobile Competence Centre, 650, Route Des Lucioles, F-06921, vol. RAN WG1, No. Chongqing, China, Oct. 14, 2019-Oct. 20, 2019, 19 Pages, Oct. 5, 2019, XP051789842, p. 7, paragraph 3, p. 15, paragraph 4, figures 3-9.

Qualcomm Incorporated: "Efficient Activation/De-Activation Mechanism for SCells in NR CA", 3GPP TSG RAN WG1 Meeting #104bis-e, R1-2103189, 3rd Generation Partnership Project, Mobile Competence Centre, 650, Route Des Lucioles, F-06921 Sophia-Antipolis Cedex, France, vol. RAN WG1, No. E-meeting, Apr. 12, 2021-Apr. 20, 2021, 7 Pages, Apr. 7, 2021, XP052177988.

* cited by examiner

Period of Cell Deactivation

Cell Interruption Period

Active Cell (Usable)

TECHNIQUES FOR DIRECT SECONDARY CELL ACTIVATION USING TEMPORARY REFERENCE SIGNALS

CROSS REFERENCE

The present application for patent claims the benefit of U.S. Provisional Patent Application No. 63/272,977 by TAKEDA et al., entitled "TECHNIQUES FOR DIRECT SECONDARY CELL ACTIVATION USING TEMPORARY REFERENCE SIGNALS," filed Oct. 28, 2021, assigned to the assignee hereof, and expressly incorporated by reference herein.

FIELD OF TECHNOLOGY

The following relates to wireless communications, including techniques for direct secondary cell (SCell) activation using temporary reference signals.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may communicate with the network via one or more serving cells (e.g., a primary cell (PCell) and a secondary cell (SCell)). In some wireless communications systems, synchronization signal blocks (SSBs) may be used to signal time and frequency tracking information of the SCell. However, these conventional SSB techniques may suffer from increased latency when activating SCells.

SUMMARY

The described techniques relate to improved methods, systems, devices, and apparatuses that support techniques for direct secondary cell (SCell) activation using temporary reference signals. Generally, the described techniques provide for direct SCell activation using temporary reference signals. In particular, aspects of the present disclosure support techniques for using layer three (L3) signaling (e.g., radio resource control (RRC) signaling) on a primary cell (PCell) to configure and activate an SCell at a user equipment (UE) using temporary reference signals. For example, a UE may receive an RRC message via a PCell which instructs the UE to activate an SCell. Subsequently, the UE may transmit an RRC complete message acknowledging the instruction to activate the SCell, and monitor resources on the SCell. The UE may then receive a temporary reference signal via the SCell that the UE may use to perform time and/or frequency tracking of the SCell, which may enable the UE to begin monitoring channel state information (CSI) reference signals (CSI-RS) on the SCell.

A method for wireless communication at a UE is described. The method may include receiving, via a first serving cell, a message including an indication to activate a second serving cell different from the first serving cell, receiving, via the first serving cell, a control message indicating a first resource for transmitting a response message responsive to the message, and triggering a reference signal associated with time and frequency tracking for the second serving cell, transmitting, via the first serving cell and within the first resource indicated via the control message, the response message acknowledging the message, and monitoring a second resource of the second serving cell for the reference signal based on the control message.

An apparatus for wireless communication at a UE is described. The apparatus may include a processor, memory coupled with the processor, and instructions stored in the memory. The instructions may be executable by the processor to cause the apparatus to receive, via a first serving cell, a message including an indication to activate a second serving cell different from the first serving cell, receive, via the first serving cell, a control message indicating a first resource for transmitting a response message responsive to the message, and triggering a reference signal associated with time and frequency tracking for the second serving cell, transmit, via the first serving cell and within the first resource indicated via the control message, the response message acknowledging the message, and monitor a second resource of the second serving cell for the reference signal based on the control message.

Another apparatus for wireless communication at a UE is described. The apparatus may include means for receiving, via a first serving cell, a message including an indication to activate a second serving cell different from the first serving cell, means for receiving, via the first serving cell, a control message indicating a first resource for transmitting a response message responsive to the message, and triggering a reference signal associated with time and frequency tracking for the second serving cell, means for transmitting, via the first serving cell and within the first resource indicated via the control message, the response message acknowledging the message, and means for monitoring a second resource of the second serving cell for the reference signal based on the control message.

A non-transitory computer-readable medium storing code for wireless communication at a UE is described. The code may include instructions executable by a processor to receive, via a first serving cell, a message including an indication to activate a second serving cell different from the first serving cell, receive, via the first serving cell, a control message indicating a first resource for transmitting a response message responsive to the message, and triggering a reference signal associated with time and frequency tracking for the second serving cell, transmit, via the first serving cell and within the first resource indicated via the control message, the response message acknowledging the message, and monitor a second resource of the second serving cell for the reference signal based on the control message.

Some examples of the method, apparatuses, and non-transitory computer-readable medium described herein may further include operations, features, means, or instructions for receiving, via the message, an indication of a set of multiple candidate reference signal resources and receiving, via the control message and based on the message, an indication of the second resource from the set of multiple candidate reference signal resources, where monitoring the second resource of the second serving cell for the reference signal may be based on the indication of the second resource.

Some examples of the method, apparatuses, and non-transitory computer-readable medium described herein may further include operations, features, means, or instructions for receiving, via the control message, an indication of a time offset associated with the second resource for the reference signal, where monitoring the second resource may be based on the time offset.

In some examples of the method, apparatuses, and non-transitory computer-readable medium described herein, the time offset indicates a period of time between the first resource and the second resource.

Some examples of the method, apparatuses, and non-transitory computer-readable medium described herein may further include operations, features, means, or instructions for receiving, via the control message, an indication of the second resource for the reference signal, where monitoring the second resource may be based on receiving the indication of the second resource.

In some examples of the method, apparatuses, and non-transitory computer-readable medium described herein, the control message includes a downlink control information (DCI) message.

In some examples of the method, apparatuses, and non-transitory computer-readable medium described herein, the control message includes an aperiodic channel state information (A-CSI) request field that triggers the reference signal associated with time and frequency tracking for the second serving cell.

Some examples of the method, apparatuses, and non-transitory computer-readable medium described herein may further include operations, features, means, or instructions for receiving, via the message, the control message, or both, an indication of one or more parameters associated with the reference signal, where monitoring the second resource may be based on the one or more parameters.

In some examples of the method, apparatuses, and non-transitory computer-readable medium described herein, the one or more parameters include a structure of the reference signal, a component carrier for the reference signal, a bandwidth part (BWP) for the reference signal, or any combination thereof.

Some examples of the method, apparatuses, and non-transitory computer-readable medium described herein may further include operations, features, means, or instructions for receiving the reference signal via the second serving cell based on the monitoring and communicating with the second serving cell based on time and frequency tracking information determined using the reference signal.

Some examples of the method, apparatuses, and non-transitory computer-readable medium described herein may further include operations, features, means, or instructions for receiving, based on the reference signal, automatic gain control (AGC) information associated with the second serving cell, where communicating with the second serving cell may be based on the AGC information.

In some examples of the method, apparatuses, and non-transitory computer-readable medium described herein, the reference signal may be received prior to an earliest synchronization signal block (SSB) which the UE may be capable of receiving via the second serving cell.

In some examples of the method, apparatuses, and non-transitory computer-readable medium described herein, the reference signal includes a temporary reference signal, a tracking reference signal, a non-zero power channel state information reference signal (NZP-CSI-RS), or any combination thereof.

A method for wireless communication at a base station is described. The method may include transmitting, to a UE via a first serving cell, a message including an indication to activate a second serving cell different from the first serving cell, transmitting, to the UE via the first serving cell, a control message indicating a first resource for transmitting a response message responsive to the message, and triggering a reference signal associated with time and frequency tracking for the second serving cell, receiving, from the UE via the first serving cell and within the first resource indicated via the control message, the response message acknowledging the message, and transmitting the reference signal to the UE within a second resource of the second serving cell based on the control message.

An apparatus for wireless communication at a base station is described. The apparatus may include a processor, memory coupled with the processor, and instructions stored in the memory. The instructions may be executable by the processor to cause the apparatus to transmit, to a UE via a first serving cell, a message including an indication to activate a second serving cell different from the first serving cell, transmit, to the UE via the first serving cell, a control message indicating a first resource for transmitting a response message responsive to the message, and triggering a reference signal associated with time and frequency tracking for the second serving cell, receive, from the UE via the first serving cell and within the first resource indicated via the control message, the response message acknowledging the message, and transmit the reference signal to the UE within a second resource of the second serving cell based on the control message.

Another apparatus for wireless communication at a network entity is described. The apparatus may include means for transmitting, to a UE via a first serving cell, a message including an indication to activate a second serving cell different from the first serving cell, means for transmitting, to the UE via the first serving cell, a control message indicating a first resource for transmitting a response message responsive to the message, and triggering a reference signal associated with time and frequency tracking for the second serving cell, means for receiving, from the UE via the first serving cell and within the first resource indicated via the control message, the response message acknowledging the message, and means for transmitting the reference signal to the UE within a second resource of the second serving cell based on the control message.

A non-transitory computer-readable medium storing code for wireless communication at a network entity is described. The code may include instructions executable by a processor to transmit, to a UE via a first serving cell, a message including an indication to activate a second serving cell different from the first serving cell, transmit, to the UE via the first serving cell, a control message indicating a first resource for transmitting a response message responsive to the message, and triggering a reference signal associated with time and frequency tracking for the second serving cell, receive, from the UE via the first serving cell and within the first resource indicated via the control message, the response message acknowledging the message, and transmit the reference signal to the UE within a second resource of the second serving cell based on the control message.

Some examples of the method, apparatuses, and non-transitory computer-readable medium described herein may further include operations, features, means, or instructions for transmitting, via the message, an indication of a set of multiple candidate reference signal resources and transmitting, via the control message and based on the message, an indication of the second resource from the set of multiple candidate reference signal resources, where transmitting the reference signal within the second resource of the second serving cell may be based on the indication of the second resource.

Some examples of the method, apparatuses, and non-transitory computer-readable medium described herein may further include operations, features, means, or instructions for transmitting, via the control message, an indication of a time offset associated with the second resource for the reference signal, where transmitting the reference signal within the second resource may be based on the time offset.

In some examples of the method, apparatuses, and non-transitory computer-readable medium described herein, the time offset indicates a period of time between the first resource and the second resource.

Some examples of the method, apparatuses, and non-transitory computer-readable medium described herein may further include operations, features, means, or instructions for transmitting, via the control message, an indication of the second resource for the reference signal, where transmitting the reference signal within the second resource may be based on transmitting the indication of the second resource.

In some examples of the method, apparatuses, and non-transitory computer-readable medium described herein, the control message includes a DCI message.

In some examples of the method, apparatuses, and non-transitory computer-readable medium described herein, the control message includes an A-CSI request field that triggers the reference signal associated with time and frequency tracking for the second serving cell.

Some examples of the method, apparatuses, and non-transitory computer-readable medium described herein may further include operations, features, means, or instructions for transmitting, via the message, the control message, or both, an indication of one or more parameters associated with the reference signal, where transmitting the reference signal within the second resource may be based on the one or more parameters.

In some examples of the method, apparatuses, and non-transitory computer-readable medium described herein, the one or more parameters include a structure of the reference signal, a component carrier for the reference signal, a BWP for the reference signal, or any combination thereof.

Some examples of the method, apparatuses, and non-transitory computer-readable medium described herein may further include operations, features, means, or instructions for communicating with the UE via the second serving cell based on time and frequency tracking information that may be determined based on the reference signal.

Some examples of the method, apparatuses, and non-transitory computer-readable medium described herein may further include operations, features, means, or instructions for transmitting, based on the reference signal, AGC information associated with the second serving cell, where communicating with the UE via the second serving cell may be based on the AGC information.

In some examples of the method, apparatuses, and non-transitory computer-readable medium described herein, the reference signal may be transmitted prior to an earliest SSB which the UE may be capable of receiving via the second serving cell.

In some examples of the method, apparatuses, and non-transitory computer-readable medium described herein, the reference signal includes a temporary reference signal, a tracking reference signal, an NZP-CSI-RS, or any combination thereof.

DETAILED DESCRIPTION

Figure 1:
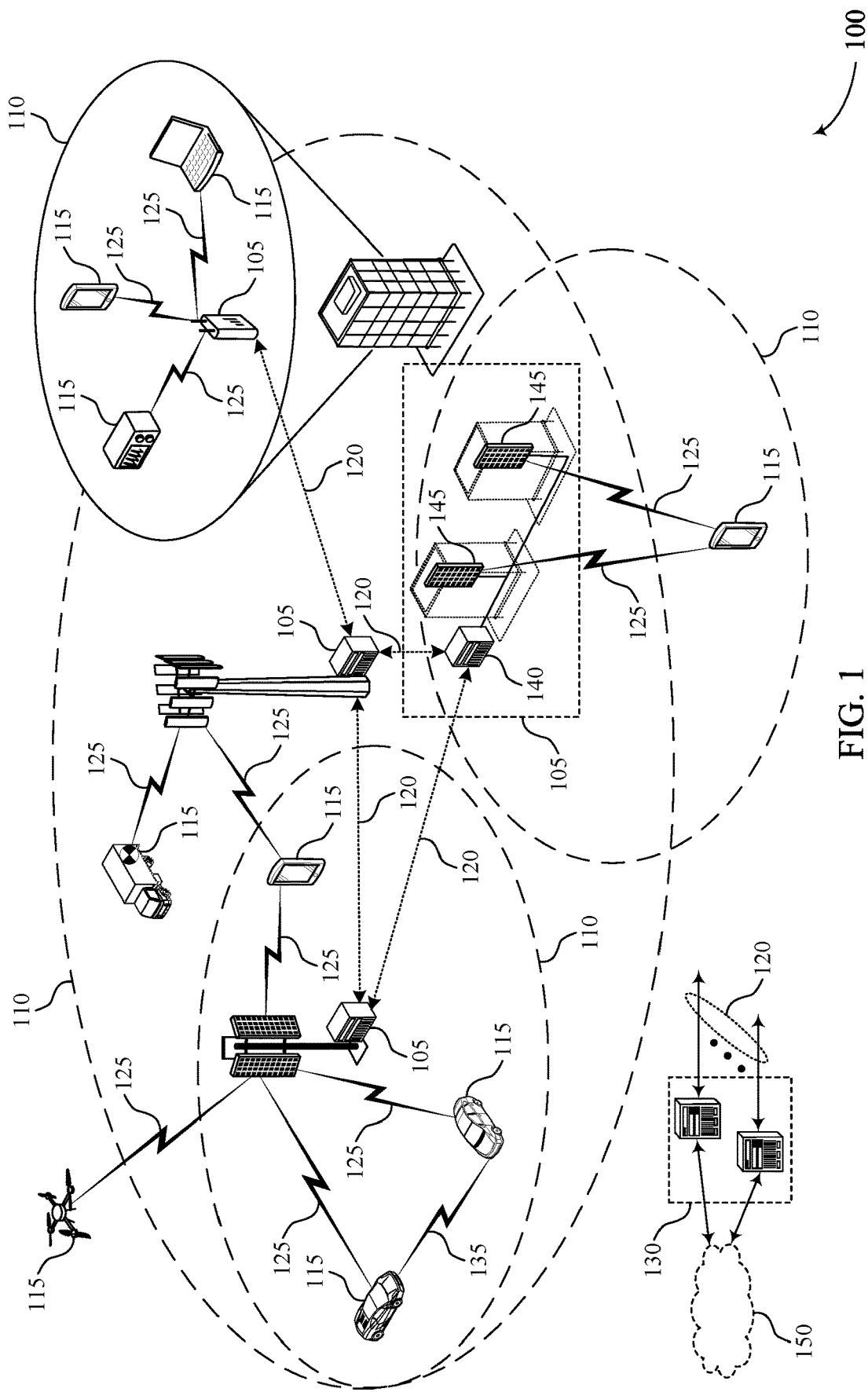
FIG. 1 illustrates an example of a wireless communications system that supports techniques for direct secondary cell (SCell) activation using temporary reference signals in accordance with aspects of the present disclosure.

In some wireless communications systems, a user equipment (UE) may communicate with the network via one or more serving cells (e.g., a primary cell (PCell) and a secondary cell (SCell)). The network may activate additional serving cells at the UE to increase data throughput, to alleviate network congestion, or both. Some wireless communications systems utilize synchronization signal blocks (SSBs) to indicate time and frequency tracking information (e.g., automatic gain control (AGC) information) for an SCell during SCell activation. However, these conventional SSB techniques may suffer from increased latency when activating SCells.

Temporary reference signals may enable UEs to quickly perform AGC for an SCell where the UE adjusts a receive amplifier gain and performs time/frequency tuning with the SCell. According to some wireless communications systems, a PCell in wireless communications with a UE may configure the SCell that is to be activated at the UE to transmit temporary reference signals, and subsequent medium access control-control element (MAC-CE) signaling on the PCell may trigger the activation of the SCell. However, in some cases, the use of separate control signaling (e.g., radio resource control (RRC) and MAC-CE signaling) to configure and activate the SCell may lead to increased control signaling overhead, and may delay the activation of the SCell. Other wireless communications systems have implemented direct SCell activation via RRC signaling which does not require MAC-CE signaling. However, some conventional direct SCell activation techniques do not provide signaling or other configurations which enable the UE to efficiently identify and monitor resources used for temporary reference signals on the SCell.

Accordingly, aspects of the present disclosure provide techniques for direct SCell activation using temporary reference signals. In particular, aspects of the present disclosure provide techniques for using layer three (L3) signaling (e.g., RRC signaling) on a PCell to configure and activate an SCell at a UE using temporary reference signals. For example, a UE may receive an RRC message from a PCell which instructs the UE to activate an SCell. Subsequently, the UE may transmit an RRC complete message acknowledging the instruction to activate the SCell, and monitor resources on the SCell. The UE may then receive a temporary reference signal from the SCell that the UE uses to perform time and/or frequency tracking of the SCell, which may enable the UE to begin monitoring channel state information (CSI) reference signals (CSI-RSs) on the SCell.

In some aspects, the resources for the temporary reference signal and/or other parameters for the temporary reference signal (e.g., structure, format, component carrier, bandwidth part (BWP)) may be indicated via the L3 message (or a physical downlink control channel (PDCCH) transmission carrying the L3 message). Additionally, or alternatively, the resources and/or parameters for the temporary reference signal may be received via a MAC-CE or layer one (L1) message (e.g., downlink control information (DCI) message) from the PCell following reception of the L3 message. In some cases, the L3 message (e.g., RRC message) may indicate a set of active transmission configuration indicator (TCI) states (e.g., active quasi co-location (QCL) configurations/assumptions) for the SCell, where the temporary reference signal is transmitted via one of the active TCI states.

Aspects of the disclosure are initially described in the context of wireless communications systems. Additional aspects of the disclosure are described in the context of example resource configurations and an example process flow. Aspects of the disclosure are further illustrated by and described with reference to apparatus diagrams, system diagrams, and flowcharts that relate to techniques for direct SCell activation using temporary reference signals.

FIG. 1 illustrates an example of a wireless communications system 100 that supports techniques for direct SCell activation using temporary reference signals in accordance with aspects of the present disclosure. The wireless communications system 100 may include one or more network entities 105 (e.g., base stations, network nodes), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The network entities 105 may be dispersed throughout a geographic area to form the wireless communications system 100 and may be devices in different forms or having different capabilities. The network entities 105 and the UEs 115 may wirelessly communicate via one or more communication links 125. Each network entity 105 may provide a coverage area 110 over which the UEs 115 and the network entity 105 may establish one or more communication links 125. The coverage area 110 may be an example of a geographic area over which a network entity 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1.

The network entities 105 (e.g., base stations, network nodes) may communicate with the core network 130, or with one another, or both. For example, the network entities 105 may interface with the core network 130 through one or more backhaul links 120 (e.g., via an S1, N2, N3, or other interface). The network entities 105 may communicate with one another over the backhaul links 120 (e.g., via an X2, Xn, or other interface) either directly (e.g., directly between network entities 105), or indirectly (e.g., via core network 130), or both. In some examples, the backhaul links 120 may be or include one or more wireless links.

One or more of the network entities 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network entity 105, or downlink transmissions from a network entity 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the physical layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the network entities 105 of the wireless communications system 100 may support techniques for direct SCell activation using temporary reference signals. In particular, aspects of the present disclosure provide techniques for using L3 signaling (e.g., RRC signaling) on a PCell to configure and activate an SCell at a UE 115 using temporary reference signals. For example, a UE 115 may receive an L3 message (e.g., RRC message) from a PCell which instructs the UE 115 to activate an SCell. In some aspects, the PCell and the SCell may be associated with (e.g., supported by) the same network entity 105 or different network entities 105. Subsequently, the UE 115 may transmit an L3 response message (e.g., RRC complete message) acknowledging the L3 message (e.g., acknowledging the instruction to activate the SCell), and monitor resources on the SCell. The UE 115 may then receive a temporary reference signal from the SCell that the UE uses to perform time and/or frequency tracking of the SCell, which may enable the UE 15 to begin monitoring CSI-RSs on the SCell.

In some aspects, the resources for the temporary reference signal and/or other parameters for the temporary reference signal (e.g., structure, format, component carrier, BWP) may be indicated via the L3 message (or a PDCCH transmission carrying the L3 message). Additionally, or alternatively, the resources and/or parameters for the temporary reference signal may be received via a MAC-CE or L1 message (e.g., DCI message, PDCCH transmission) from the PCell following reception of the L3 message. In some cases, the L3 message (e.g., RRC message) may indicate a set of active TCI states (e.g., active QCL assumptions) for the SCell, where the temporary reference signal is transmitted via one of the active TCI states.

Techniques described herein may provide for improved wireless communications by improving direct SCell activation using RRC signaling (e.g., L3 signaling). In particular, techniques described herein may provide signaling and other configurations which enable the network to indicate sets of resources and other parameters for temporary reference signals used for SCell activation via RRC signaling. By enabling UEs 115 to identify resources for temporary reference signals using RRC signaling, techniques described herein may reduce a time required for SCell activation relative to SCell activation schemes that do not use temporary reference signals. Additionally, techniques described herein may re-use (or re-purpose) fields within existing control signaling used for the SCell activation (e.g., reuse fields within uplink DCI messages which schedule RRC response messages for SCell activation), which may enable direct SCell activation without increasing control signaling used for SCell activation.

Figure 2:
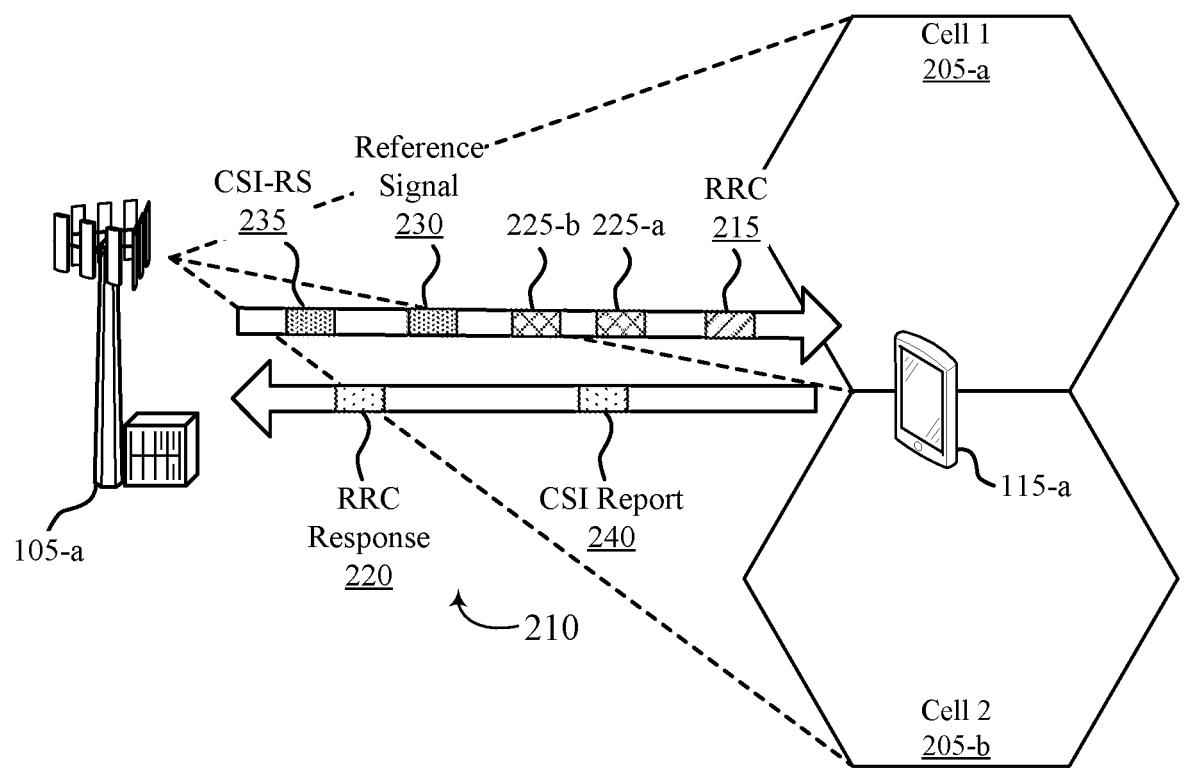
FIG. 2 illustrates an example of a wireless communications system that supports techniques for direct SCell activation using temporary reference signals in accordance with aspects of the present disclosure.

FIG. 2 illustrates an example of a wireless communications system 200 that supports techniques for direct SCell activation using temporary reference signals in accordance with aspects of the present disclosure. The wireless communications system 200 may implement, or be implemented by, aspects of wireless communications system 100. The wireless communications system 200 may include a UE 115-a and a network entity 105-a, which may be examples of UEs 115 and network entities 105, as described with reference to FIG. 1.

The wireless communications system 200 may support wireless communications with wireless devices (e.g., UE 115-a) via one or more serving cells 205 of the wireless communications system 200. In particular, each serving cell 205 may be supported by one or more network entities 105 of the wireless communications system 200. For example, as shown in FIG. 2, the wireless communications system 200 may include a first serving cell 205-a supported by the network entity 105-a, and a second serving cell 205-b supported by the network entity 105-a. The serving cells 205 may include PCells, SCells, primary-secondary cells (PS-Cells) of a secondary cell group (SCG), or any combination thereof. For example, the first serving cell 205-a may include a PCell, and the second serving cell 205-b may include an SCell. The wireless communications system 200 may include any quantity of serving cells 205 supported by any quantity of network entities 105. For example, in additional or alternative cases, the first serving cell 205-a may be supported by the network entity 105-a, and the second serving cell 205-b may be supported by a second network entity 105 (not shown) which is different from the network entity 105-a.

In some cases, the first serving cell 205-a, the second serving cell 205-b, or both, may be associated with a given radio access technology, such as a 5G radio access technology, an NR access technology, a 4G radio access technology, an LTE radio access technology, or any combination thereof. In some cases, techniques described herein may be implemented in the context of dual connectivity scenarios. In this regard, the second serving cell 205-b may be associated with the same or different radio access technology as the radio access technology associated with the first serving cell 205-a. For example, in cases where the first serving cell 205-a is associated with a 5G or NR access technology, the second serving cell 205-b may be associated with a 4G radio access technology, an LTE radio access technology, or both. Moreover, in some cases, the first serving cell 205-a and the second serving cell 205-b may be associated with different frequency bands associated with a common radio access technology. For example, in some cases, both the first and second serving cells 205-a and 205-b may be associated with an NR access technology, where the first serving cell 205-a is associated a frequency range one (FR1) frequency band of the NR access technology and the second serving cell 205-b is associated a frequency range two (FR2) frequency band of the NR access technology.

In some aspects, the UE 115-a may communicate with the network entity 105-a using one or more beams, one or more carriers, one or more communications links, or any combination thereof. For example, each serving cell 205 may be associated with a same or different frequency range, separate beams, separate component carriers, and/or communications links to facilitate wireless communications between the UE 115-a and the respective serving cells 205. In some cases, the communication link 210 may include an example of an access link (e.g., a Uu link). The communication link 210 may include a bi-directional link that can include both uplink and downlink communication. For example, the UE 115-a may transmit uplink transmissions, such as uplink control signals or uplink data signals, to the network entity 105-a using the communication link 210, and the network entity 105-a may transmit downlink transmissions, such as downlink control signals or downlink data signals, to the UE 115-a using the communication link 210.

The wireless communications system 200 may support temporary reference signals to expedite the activation process during an SCell activation to improve efficiency. The temporary reference signal may be supported for SCell activation in, for example, FR1, FR2, and/or some other frequency range(s). Broadly, the temporary reference signal may support functionalities related to AGC settling, time and/or frequency tracking/tuning during SCell activation, and the like.

In some aspects, a temporary reference signal may also be referred to as an aperiodic reference signal, which may be an example of a tracking reference signal, an aperiodic CSI-RS, a persistent CSI-RS, a semi-persistent CSI-RS, a sounding reference signal (SRS), a reference signal based on primary sync signal (PSS) and/or secondary sync signal (SSS), or any combination thereof. Other examples of reference signal types that may be configured as an aperiodic reference signal include, but are not limited to, a phase tracking reference signal, a beam tracking/management reference signal, and the like. Accordingly, the terms tracking reference signal, aperiodic reference signal, new temporary reference signal, and the like, may be used interchangeably herein.

For example, in some cases, a set of multiple tracking reference signals may form a temporary reference signal. The set of multiple tracking reference signals may be transmitted/broadcast by an SCell for time and frequency tracking (and/or AGC) by a UE 115 during SCell activation. In such cases, each tracking reference signal of the set of multiple tracking reference signals may span one or more OFDM symbols in one or more slots. The tracking reference signals may be consecutive in the time domain, or may be separated in the time domain by one or more OFDM symbols. For example, an SCell may transmit/broadcast a first pair of tracking reference signals and a second pair of tracking reference signals, where each of the first pair and second pair of tracking reference signals include tracking reference signals in consecutive slots. In this example, the first pair of tracking reference signals and the second pair of tracking reference signals may be separated in the time domain by one or more slots (e.g., two slot gap between the pairs of tracking reference signals).

In some cases, a tracking reference signal waveform may be selected as the temporary reference signal (e.g., as an aperiodic reference signal) for SCell activation. In some examples, the temporary reference signal may be triggered by DCI, MAC CE, and the like. Some wireless communications systems utilize temporary reference signals to improve SCell activation. Temporary reference signals may enable UEs 115 to quickly perform AGC for an SCell where the UE 115 adjusts a receive amplifier gain and performs time/frequency tuning with the SCell. A UE 115 may measure the triggered temporary reference during the SCell activation procedure no earlier than within a configured time threshold (e.g., no earlier than a slot m). Depending on a periodicity of SSBs on the SCell, the temporary reference signal may be received by the UE 115 via the SCell prior to an earliest receivable SSB, which may expedite the SCell activation process.

In some aspects, the UE 115-a and the network entity 105-a of the wireless communications system 200 may support techniques for direct SCell activation using temporary reference signals. In particular, the UE 115-a and the network entity 105-a (e.g., serving cells 205-a, 205-b) may support techniques for using RRC signaling (e.g., L3 signaling) on a PCell to configure and activate an SCell at the UE 115-a using temporary reference signals.

For example, as illustrated in FIG. 2, the UE 115-a may establish wireless communications with the first serving cell 205-a. In some aspects, the UE 115-a may establish the wireless communications with the first serving cell 205-a by initiating or otherwise performing a setup procedure with the first serving cell 205-a. In some aspects, the first serving cell 205-a and the second serving cell 205-b may be associated with the same frequency band (e.g., intra-band carrier aggregation). In some aspects, the first serving cell 205-a, the second serving cell 205-b, or both, may include a PCell, an SCell, a PSCell of an SCG, or any combination thereof. For example, in cases where the first serving cell 205-a includes a PCell, the second serving cell 205-b may include an SCell. The first serving cell 205-a and the second serving cell 205-b may be supported by the same network entity 105-a or different network entities 105.

In some aspects, the UE 115-a may receive, via the first serving cell 205-a, an RRC message 215 (e.g., L3 message) including an indication to activate the second serving cell 205-b. In this regard, the RRC message 215 may initiate an RRC configuration and/or reconfiguration procedure for activating the second serving cell 205-b at the UE 115-a. In some aspects, the RRC message 215 may trigger a reference signal 230 on the second serving cell 205-b for SCell activation. In this regard, the RRC message 215 may directly activate the second serving cell 205-b, and may activate the reference signal 230 on the second serving cell 205-b. For example, the RRC message 215 may include an indication of a resource (or set of resources) for a reference signal 230 on the second serving cell 205-b which will be used to facilitate SCell activation.

As noted previously herein, the UE 115-a may use the reference signal 230 on the second serving cell 205-b to perform time and frequency tracking, AGC, or both during activation of the second serving cell 205-b. The reference signal 230 may include a temporary reference signal, a tracking reference signal, a non-zero power channel state information reference signal (NZP-CSI-RS), an SSB, or any combination thereof. For example, the temporary reference signal 230 triggered by the RRC message 215 may include one or multiple NZP-CSI-RS resource sets, where each NZP-CSI-RS resource set includes one or multiple NZP-CSI-RS resources labeled as trs-info.

The RRC message 215 may indicate one or more parameters associated with the reference signal 230 on the second serving cell 205-b. Parameters associated with the reference signal 230 which may be indicated via the RRC message 215 may include a structure of the reference signal 230, a component carrier for the reference signal 230, a BWP for the reference signal 230, TCI states for the reference signal 230, QCL configurations (e.g., QCL assumptions) for the reference signal 230, or any combination thereof. For example, the RRC message 215 may indicate a structure/type of reference signal 230, which component carrier(s) are associated with the triggered reference signal 230, and/or which BWP(s) are associated with the triggered reference signal 230 within the indicated component carriers.

By way of another example, the RRC message 215 may indicate one or more TCI states (e.g., one or more active QCL configurations/assumptions) associated with the second serving cell 205-b which may be used to transmit the triggered reference signal 230. For instance, the RRC message 215 may indicate TCI state information and/or QCL information which indicates which reference signal 230 the NZP-CSI-RS resources are QCLed with, and whether the QCL source reference signal 230 may include an SSB or other NZP-CSI-RS resource. For the purposes of the present disclosure, the terms "QCL configuration" and "QCL assumption" may be used interchangeably.

In some aspects, the UE 115-a may receive an additional control message 225-a (e.g., additional control signaling) via the first serving cell 205-a. For example, the UE 115-a may receive a MAC-CE or other L2 message (e.g., control message 225-a) via the first serving cell 205-a in addition to the RRC message 215. In some cases, the control message 225-b may be transmitted/received together with the RRC message 215 (e.g., within a same physical downlink shared channel (PDSCH) message). In additional or alternative cases, the control message 225-b and the RRC message 215 may be transmitted/received in separate control messages (e.g., within separate PDSCH messages). In some aspects, the control message 225-a (e.g., MAC-CE, L2 message) may include an indication of the resource for the reference signal 230 on the second serving cell 205-b. Additionally, or alternatively, the control message 225-a may indicate one or more parameters associated with the reference signal 230 on the second serving cell 205-b (e.g., structure, component carrier, BWP, TCI states, QCL configurations). In this regard, the resource(s) and/or other parameters for the reference signal 230 on the second serving cell 205-b may be indicated via the RRC message 215 (e.g., L3 message), via the control message 225-a (e.g., MAC-CE, L2 message), or both.

The UE 115-a may transmit, via the first serving cell 205-a, an RRC response message 220 (e.g., RRC complete message, L3 response message). In some aspects, the UE 115-a may transmit the RRC response message 220 in response to the RRC message 215. The RRC response message 220 may indicate a completion of the RRC configuration/reconfiguration procedure which was triggered by the RRC message 215. As such, the transmission of the RRC response message 220 may indicate an end of $T_{RRC\_Process}$ time interval, and a beginning of an activation time interval $T_{ActivationTime}$ for activating the second serving cell 205-b. Additionally, or alternatively, the UE 115-a may transmit the RRC response message 220 based on receiving the control message 225-a (e.g., MAC-CE, L2 message).

In some implementations, the UE 115-a may receive an additional control message 225-b (e.g., additional control signaling) via the first serving cell 205-a. For example, the UE 115-a may receive the additional control message 225-b including a DCI message or other L1 message via the first serving cell 205-a. In some aspects, the UE 115-a may receive the control message 225-b (e.g., DCI message) following transmission of the RRC response message 220. In particular, the UE 115-a may receive the control message 225-b (e.g., DCI message) within the activation time interval ($T_{ActivationTime}$) following the transmission of the RRC response message 220. In this regard, the UE 115-*a* may receive the control message 225-*b* (e.g., DCI message, L1 message) based on receiving the RRC message 215, receiving the control message 225-*a* (e.g., MAC-CE, L2 message), transmitting the RRC response message 220, or any combination thereof.

In some aspects, the control message 225-*b* (e.g., DCI message, L1 message) may include an indication of the resource for the reference signal 230 on the second serving cell 205-*b*. Additionally, or alternatively, the control message 225-*b* (e.g., DCI message, L1 message) may indicate one or more parameters associated with the reference signal 230 on the second serving cell 205-*b* (e.g., structure, component carrier, BWP, TCI states, QCL configurations). In this regard, the resource(s) and/or other parameters for the reference signal 230 on the second serving cell 205-*b* may be indicated via the RRC message 215 (e.g., L3 message), via the control message 225-*a* (e.g., MAC-CE, L2 message), via the control message 225-*b* (e.g., DCI message, L1 message), or any combination thereof.

The UE 115-*a* may identify the resource for the reference signal 230 which is to be received via the second serving cell 205-*b*. The UE 115-*a* may identify the resource for the reference signal 230 within the activation time interval ($T_{ActivationTime}$) following the transmission of the RRC response message 220 (e.g., RRC complete message, L3 response message). In this regard, the UE 115-*a* may identify the resource for the reference signal 230 associated with time and frequency tracking for the second serving cell 205-*b* based on receiving the RRC message 215, receiving the control message 225-*a* (e.g., MAC-CE, L2 message), transmitting the RRC response message 220, receiving the control message 225-*b* (e.g., DCI message, L1 message), or any combination thereof.

Additionally, or alternatively, the UE 115-*a* may identify one or more parameters (e.g., structure, component carrier, BWP, TCI states, QCL configurations) associated with the reference signal 230. The UE 115-*a* may identify the resource(s) and/or other parameters for the reference signal 230 based on the higher-layer configuration and trigger signaling (e.g., RRC message 215, MAC-CE, DCI message) received via the first serving cell 205-*a*. In other words, the resource and other parameters for the reference signal 230 for the second serving cell 205-*b* may be provided to the UE 115-*b* by the trigger signaling, preliminarily provided to the UE 115-*a* via earlier RRC configurations or signaling, via signaling which triggers the reference signal 230, or any combination thereof.

Subsequently, the UE 115-*a* may monitor the resource for the reference signal 230 on the second serving cell 205-*b*. In this regard, the UE 115-*a* may monitor the resource for the reference signal 230 based on identifying the resource and/or other parameters (e.g., structure, component carrier, BWP, TCI states, QCL configurations) associated with the reference signal 230. Moreover, the UE 115-*b* may monitor the resource for the reference signal 230 based on receiving the RRC message 215, receiving the control message 225-*a* (e.g., MAC-CE, L2 message), transmitting the RRC response message 220, receiving the control message 225-*b* (e.g., DCI message, L1 message), or any combination thereof.

In some cases, the UE 115-*a* may assume that a TCI state (e.g., QCL configuration or QCL assumption) of the reference signal 230 to be transmitted by the second serving cell 205-*b* may be selected from a set of active TCI states (or active QCL configurations), if sets of active TCI states/QCL configurations have been configured. In other words, the second serving cell 205-*b* may not transmit the reference signal 230 with a TCI state (or QCL configuration) which is not in a configured active set of TCI states/QCL configurations.

For example, as noted previously herein, the UE 115-*a* may receive an indication of a set of active TCI states and/or active QCL configurations via the RRC message 215, via the control message 225-*a* (e.g., MAC-CE), via the control message 225-*b* (e.g., DCI message), or any combination thereof. In other words, the set of active TCI states may be activated by the RRC message 215 which directly activates the SCell (e.g., second serving cell 205-*b*), via the MAC-CE of a PDSCH transmission carrying the RRC message 215 which directly activates the SCell, via a DCI message which directly activates the SCell, or any combination thereof. In this example, the UE 115-*a* may assume that the reference signal 230 will be transmitted in accordance with one of the active TCI states/active QCL configurations, and may monitor the resource for the reference signal 230 based on (e.g., in accordance with) one or more of the active TCI states and/or active QCL configurations.

The UE 115-*a* may receive the reference signal 230 (e.g., temporary reference signal, tracking reference signal, NZP-CSI-RS, SSB) via the second serving cell 205-*b*. The UE 115-*a* may receive the reference signal 230 within the resource for the reference signal 230, and based on monitoring the resource for the reference signal 230. Additionally, the UE 115-*a* may receive the reference signal 230 in accordance with the one or more parameters (e.g., structure, component carrier, BWP, active TCI state, active QCL configuration) for the reference signal 230. In some aspects, the UE 115-*a* may receive the reference signal 230 prior to an earliest SSB which the UE 115-*a* is capable of receiving via the second serving cell 205-*b*.

In some aspects, the UE 115-*a* may perform time and frequency tracking during activation of the second serving cell 205-*b* based on receiving the reference signal 230 via the second serving cell 205-*b*. For example, the reference signal 230 may be used by the UE 115-*a* to perform time and frequency tracking and/or AGC during activation of the second serving cell 205-*b*. In this regard, the UE 115-*a* may be configured to perform measurements and/or adjust time tracking and/or frequency tracking for the second serving cell 205-*b* based on receiving the reference signal 230 via the second serving cell 205-*b*.

Upon performing time/frequency tracking, AGC, or both, during activation of the second serving cell 205-*b*, the UE 115-*b* may be able to perform CSI reporting procedures with the second serving cell 205-*b*. Accordingly, in some aspects, the UE 115-*a* may receive a CSI-RS 235 via the second serving cell 205-*b*. The UE 115-*a* may receive the CSI-RS 235 based on performing the time and frequency tracking (e.g., AGC) for the second serving cell 205-*b*. The UE 115-*b* may be configured to perform measurements on the received CSI-RS 235 for CSI reporting. Subsequently, the UE 115-*a* may transmit a CSI report 240 via the second serving cell 205-*b*. In particular, the UE 115-*a* may transmit the CSI report 240 based on performing measurements on the CSI-RS 235. In this regard, the CSI report 240 transmitted to the second serving cell 205-*b* may include an indication of the measurements performed on the CSI-RS 235.

In some aspects, the UE 115-*a* may communicate with the second serving cell 205-*b* based on performing the time and frequency tracking (e.g., AGC) during activation of the SCell based on the reference signal 230. Additionally, or alternatively, the UE 115-*a* may communicate with the second serving cell 205-*b* based on receiving the CSI-RS 235, transmitting the CSI report 240, or both.

Techniques described herein may provide for improved wireless communications by improving direct SCell activation using RRC signaling. In particular, techniques described herein may provide signaling and other configurations which enable the network to indicate sets of resources and other parameters for temporary reference signals 230 used for SCell activation via RRC signaling. By enabling the UE 115-*a* to identify resources for temporary reference signals 230 using RRC signaling, techniques described herein may reduce a time required for SCell activation relative to SCell activation schemes that do not use temporary reference signals. Additionally, techniques described herein may re-use (or re-purpose) fields within existing control signaling used for the SCell activation (e.g., reuse fields within uplink DCI messages which schedule RRC response messages for SCell activation), which may enable direct SCell activation without increasing control signaling used for SCell activation.

Figure 3:
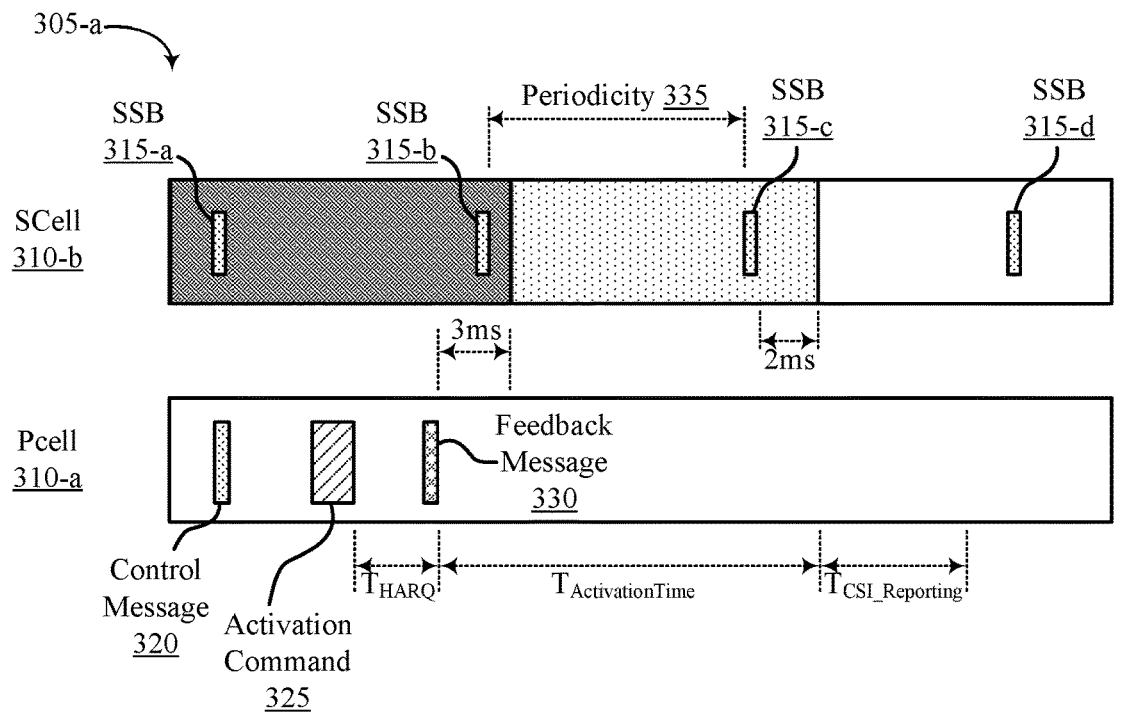
FIG. 3 illustrates an example of a resource configuration that supports techniques for direct SCell activation in accordance with aspects of the present disclosure.
Figure 3:
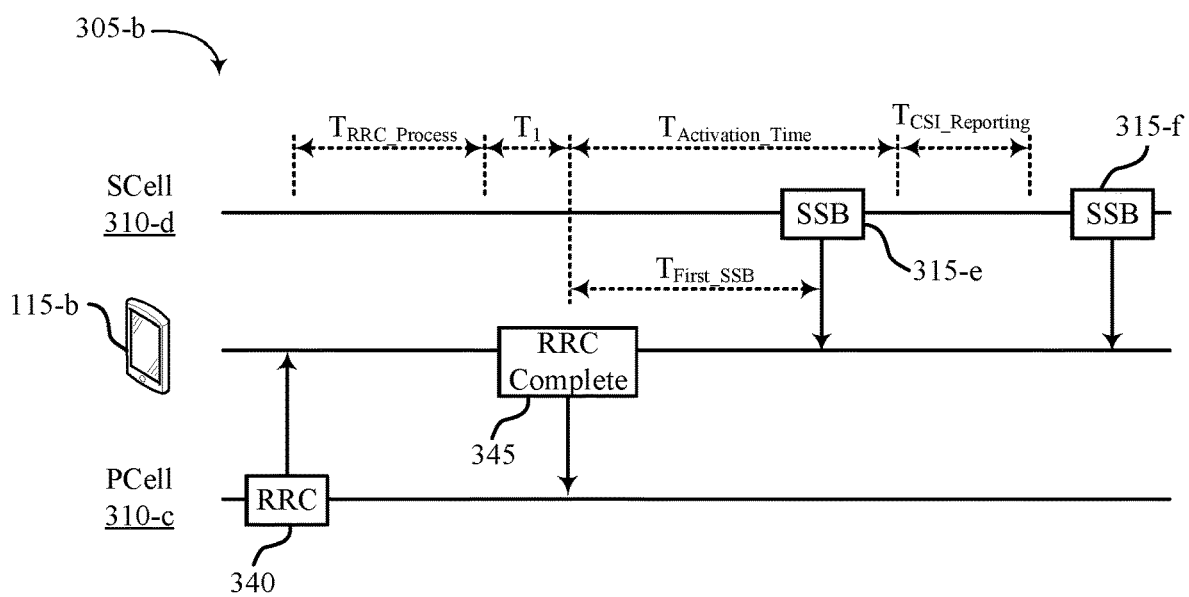
Figure 3:
Figure 3:
Figure 3:

FIG. 3 illustrates an example of a resource configuration 300 that supports techniques for direct SCell activation in accordance with aspects of the present disclosure. The resource configuration 300 may implement, or be implemented by, aspects of wireless communications system 100, wireless communications system 200, or both. The resource configuration 300 illustrates a first SCell activation scheme 305-*a* and a second SCell activation scheme 305-*b*. In particular, the first SCell activation scheme 305-*a* illustrates an SCell activation procedure which utilizes MAC-CE signaling, and the second SCell activation scheme 305-*b* illustrates a direct SCell activation procedure which utilizes RRC signaling.

According to some conventional techniques, upon receiving the SCell activation command in a slot, a UE 115 may support transmitting a valid CSI report and applying the actions related to the SCell activation command for the SCell being activated no later than in slot $$n + \frac{T_{HARQ} + T_{activation\_time} + T_{CSI\_Reporting}}{NR\ Slot\ Length}.$$

$T_{HARQ}$ may refer to the timing (in ms) between the downlink data transmission and the acknowledgment of the downlink data transmission (e.g., HARQ-ACK feedback). $T_{activation\_time}$ may refer to the SCell activation delay in ms. If the SCell being activated is known and belongs to FR1, $T_{activation\_time}$ may be $T_{FirstSSB}$+5 ms if the SCell measurement cycle is equal to or smaller than 160 ms (e.g., to support fine tracking) or $T_{FirstSSB\_Max}$+$T_{rs}$+5 ms if the SCell measurement cycle is larger than 160 ms (e.g., to support AGC plus fine time/frequency tracking). If the SCell is unknown and belongs to FR1, provided that certain conditions are satisfied, $T_{activation\_time}$ may be $T_{FirstSSB\_Max}$+$T_{SMTC\_Max}$+$2*T_{rs}$+5 ms (e.g., to support AGC, fine time/frequency tracking, and SSB detection). $T_{rs}$ may generally refer to the SSB-based measurement and timing configuration (SMTC) periodicity of the SCell being activated if the UE 115 has been provided with an SMTC configuration for the SCell in the SCell addition message. Otherwise, $T_{rs}$ may refer to the SMTC configured in the measObjectNR having the same SSB frequency and subcarrier spacing.

If the UE 115 is not provided an SMTC configuration or measurement object on this frequency, the requirement which involves $T_{rs}$ may be applied with $T_{rs}$ being equal to 5 ms assuming the SSB transmission periodicity is 5 ms. $T_{FirstSSB}$ may refer to the time to the end of the first complete SSB burst indicated by the SMTC after slot $$n + T_{HARQ} + \frac{T_{HARQ} + 3\ ms}{NR\ slot\ length}.$$

$T_{FirstSSB\_Max}$ may refer to the time to the end of the first complete SSB burst indicated by the SMTC after slot $$n + T_{HARQ} + \frac{T_{HARQ} + 3\ ms}{NR\ slot\ length}.$$

This may fulfill the requirement that, in FR1 and in the case of intra-band SCell activation, the occasion when all active serving cells and SCells being activated or released are transmitting SSB burst in the same slot. In the case of inter-band SCell activation, this may refer to the first occasion when the SCell being activated is transmitting an SSB burst. In FR2, this may refer to the occasion when all active serving cells and SCells being activated or released are transmitting SSB burst in the same slot.

For example, referring to the first SCell activation scheme 305-*a*, a UE 115 may be in wireless communications with a PCell 310-*a* at a time in which an SCell 310-*b* is deactivated at the UE 115. The SCell 310-*b* may transmit/broadcast SSBs 315 (e.g., SSBs 315-*a*, 315-*b*, 315-*c*, 315-*d*) at a periodicity 335, where the SSBs 315 may be used for time/frequency tracking, AGC, or both, during activation of the SCell 310-*b*. The UE 115 may receive, via the PCell 310-*a*, a control message 320 (e.g., RRC message) which configures or initiates activation of the SCell 310-*b* at the UE 115. Subsequently, the UE 115 may receive, via the PCell 310-*a*, an activation command 325 (e.g., MAC-CE) which activates the SCell 310-*b*. The UE 115 may transmit a feedback message 330 (e.g., ACK) in response to the activation command 325 after a time interval $T_{HARQ}$.

Continuing with reference to the first SCell activation scheme 305-*a*, an activation time $T_{ActivationTime}$ may be initiated following transmission of the feedback message 330. Following transmission of the feedback message 330, there may be some delay (e.g., 3 ms delay) before the UE 115 may begin communicating with the SCell 310-*b*. Depending on the periodicity 335 of the SSBs 315 and the relative timing of the SSBs 315 on the SCell 310-*b*, the delay following the feedback message 330 may cause the UE 115 to miss SSB 315-*b* on the SCell 310-*b*. As a result, the UE 115 may have to wait until the following SSB 315-*c* to perform time/frequency tracking and AGC for the SCell 310-*b*. Upon receiving the SSB 315-*c*, there may be some delay (e.g., 2 ms) until an end of $T_{ActivationTime}$ and a beginning of $T_{CSI\_Reporting}$. Following an end of $T_{CSI\_Reporting}$ the UE 115 may begin receiving CSI-RSs via the SCell 310-*b*, and transmit CSI reports in order to communicate via the activated SCell 310-*b*. Accordingly, the SCell activation delay (SCell$_{ActivationDelay}$, or $N_{Direct}$) for the first SCell activation scheme 305-*a* may be represented as $$\frac{T_{HARQ} + T_{activation\_time} + T_{CSI\_Reporting}}{NR\ Slot\ Length}.$$

Additionally, or alternatively, direct SCell activation techniques (e.g., fast SCell activation) using L3 signaling (e.g., RRC signaling) may be used to activate an SCell 310 at a UE 115. As noted previously herein in the context of MAC-CE SCell activation techniques, direct SCell activation techniques may exhibit an activation delay requirement, which may be a function of $T_{ActivationTime}$ and a beginning of $T_{CSI\_Reporting}$. In some cases, a duration of $T_{ActivationTime}$ may be based on an assumption that SSBs 315 are used for SCell 310 activation.

For example, referring to the second SCell activation scheme 305-b, a UE 115-b may be in wireless communications with a PCell 310-c at a time in which an SCell 310-d is deactivated at the UE 115-b. As noted previously herein, the SCell 310-b may transmit/broadcast SSBs 315 (e.g., SSB 315-e, 315-f), where the SSBs 315 may be used for time/frequency tracking and/or AGC during activation of the SCell 310-d. The UE 115 may receive, via the PCell 310-a, an RRC message 340 which configures or initiates activation of the SCell 310-d at the UE 115-b. Transmission/reception of the RRC message 340 may mark the beginning of a time interval ($T_{RRC\_Process}$) for RRC configuration/reconfiguration.

Continuing with reference to the second SCell activation scheme 305-b, the UE 115-b may transmit an RRC complete message 345 in response to the RRC message 340. The RRC complete message 345 may indicate an acknowledgment of the RRC message 340 and/or the configuration/activation of the SCell 310-d. The RRC complete message 345 may be transmitted following a time interval $T_1$, which defines a delay from slot $$n + \frac{T_{RRC\_Process}}{NR\ Slot\ Length}.$$

A duration of time interval $T_1$ may be based on a complexity and capability of the UE 115-b, and may therefore be UE-implementation dependent. An activation time $T_{ActivationTime}$ may be initiated following transmission of the RRC complete message 345. Moreover, $T_{FirstSSB}$ may define a duration from the RRC complete message 345 and a first SSB 315-e which may be received and/or processed by the UE 115-b. Upon receiving the SSB 315-e, there may be some delay (e.g., 2-3 ms) until an end of $T_{ActivationTime}$ and a beginning of $T_{CSI\_Reporting}$. Following an end of $T_{CSI\_Reporting}$, the UE 115-b may begin receiving CSI-RSs via the SCell 310-d, and transmit CSI reports in order to communicate via the activated SCell 310-d. Accordingly, the SCell activation delay ($SCell_{ActivationDelay}$, or $N_{Direct}$) for the second SCell activation scheme 305-b may be represented as $T_{RRC\_Process}+T_1+T_{activation\_time}+T_{CSI\_Reporting}-3$ ms.

Attendant advantages of the aspects of the present disclosure may be further shown and described with reference to FIGS. 4 and 5.

Figure 4:
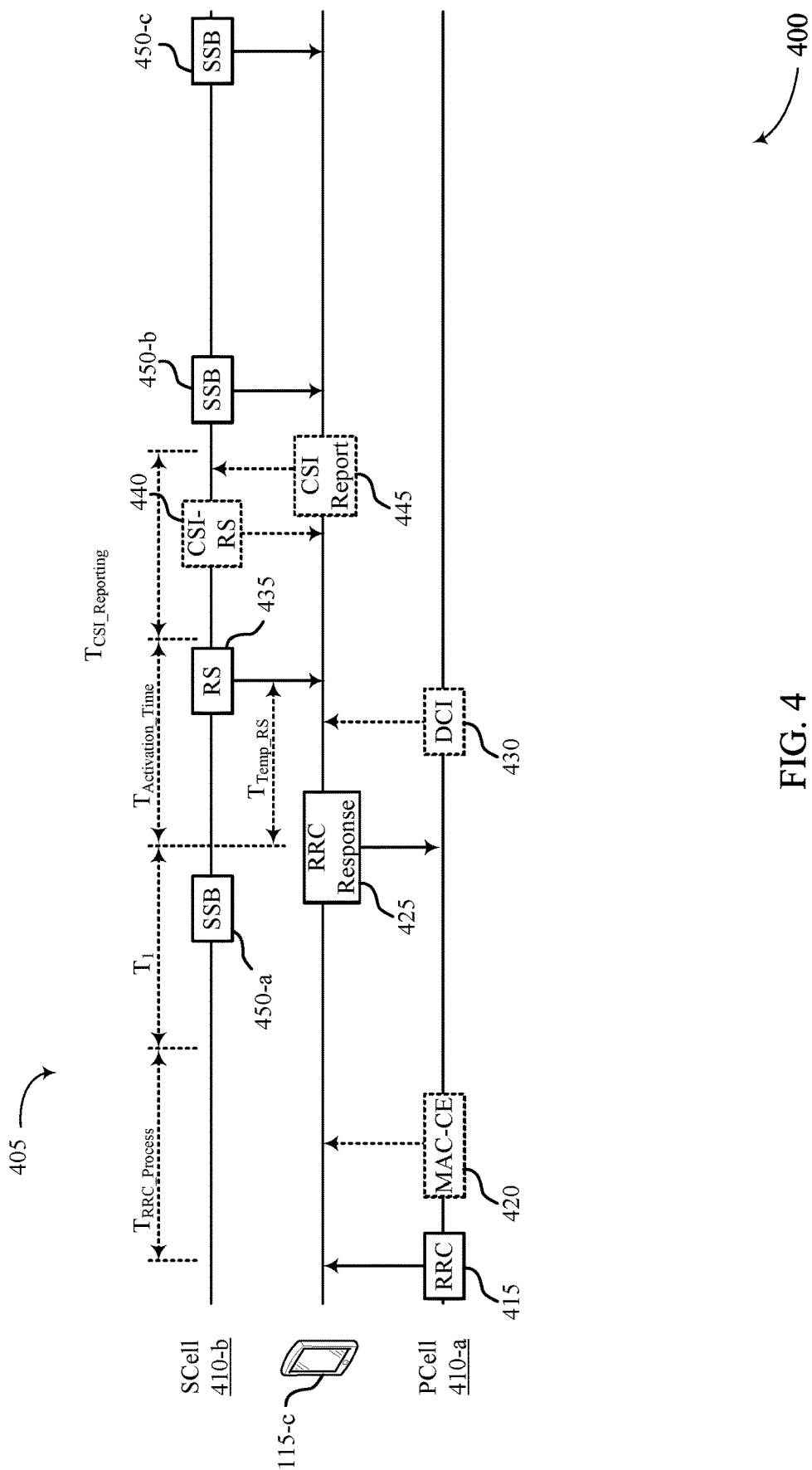
FIG. 4 illustrates an example of a resource configuration that supports techniques for direct SCell activation using temporary reference signals in accordance with aspects of the present disclosure.

FIG. 4 illustrates an example of a resource configuration 400 that supports techniques for direct SCell activation using temporary reference signals in accordance with aspects of the present disclosure. The resource configuration 400 may implement, or be implemented by, aspects of wireless communications system 100, wireless communications system 200, resource configuration 300, or any combination thereof.

The resource configuration 400 includes an SCell activation scheme 405 which illustrates a direct SCell activation procedure which utilizes RRC (e.g., L3) signaling. As noted previously herein, techniques for direct SCell activation using RRC signaling and temporary reference signals may reduce how long it takes for a UE 115 to perform SCell activation.

For example, as shown in FIG. 4, a UE 115-c may be communicatively coupled to a PCell 410-a (e.g., first serving cell), where the PCell 410-a initiates activation of an SCell 410-b (e.g., second serving cell) at the UE 115-c. As noted previously herein, the SCell activation delay ($SCell_{ActivationDelay}$, or $N_{Direct}$) for activation of the SCell 410-b at the UE 115-c may be represented as $T_{RRC\_Process}+T_1+T_{activation\_time}+T_{CSI\_Reporting}-3$ ms.

The SCell 410-b may transmit SSBs 450 (e.g., SSBs 450-a, 450-b, 450-c) at an SSB periodicity. According to some conventional techniques, SSBs 450 may be used by the UE 115-c for time/frequency tracking, AGC, or both, during activation of the SCell 410-b. However, use of the SSBs 450 for time/frequency tracking may result in increased latency for SCell 410-b activation.

Accordingly, as described herein, the SCell activation scheme 405 illustrated in FIG. 4 may utilize a reference signal 435 to facilitate direct SCell activation (e.g., fast SCell activation) at the UE 115-c. The reference signal 435 may be used for time and frequency tracking and/or AGC during activation of the SCell 410-b to expedite SCell activation at the UE 115-c. The reference signal 435 may include a temporary reference signal, a tracking reference signal, an NZP-CSI-RS, a temporary/aperiodic SSB, or any combination thereof. In particular, the UE 115-c may receive the reference signal 435 prior to a first SSB 450 (e.g., SSB 450-b) which may be received/processed by the UE 115-c via the SCell 410-b. In this regard, the use of the reference signal 435 may reduce a time it takes for the UE 115-c to perform time/frequency tracking for the SCell 410-b, which may expedite CSI reporting and communications between the UE 115-c and the SCell 410-b. In some aspects, the reference signal 435 may be transmitted/repeated multiple times (e.g., multiple reference signal bursts). For example, the UE 115-c may receive a first reference signal 435 (e.g., first reference signal burst) for AGC, and a second reference signal 435 (e.g., second reference signal burst) for time/frequency tracking.

In cases where the reference signal 435 is triggered/activated via the RRC message 415, the MAC-CE message 420, and/or a MAC-CE message of a PDSCH carrying the RRC message 415 that directly activates the SCell 410-b, the reference signal 435 may be triggered after $T_{RRC\_Process}+T_1+x$, where x may be 0 ms, 3 ms, and the like. Comparatively, in cases where the DCI message 430 (e.g., UL DCI format with aperiodic CSI (A-CSI) request) triggers the reference signal 435, the DCI message triggering the reference signal 435 may be received after $T_{RRC\_Process}+T_1+x$, where x may be 0 ms, 3 ms. While the DCI message 430 is shown as occurring after the RRC message 415 in the time domain, this is provided solely for illustrative purposes. For example, in some cases, the DCI message 430 may schedule a PDSCH transmission including the RRC message 415 and/or the MAC-CE 420, and may therefore come before the RRC message 415 and/or the MAC-CE 420 in the time domain.

In some aspects, a resource(s) and/or other parameters (e.g., structure, component carrier, BWP, TCI state, QCL configuration) for the reference signal 435 on the SCell 410-b may be indicated to the UE 115-c via higher-layer configuration and trigger signaling received via the PCell 410-a. For example, the resource for the reference signal 435 may be indicated via an RRC message 415 (e.g., L3 message), a MAC-CE 420 (e.g., L2 message), a DCI message 430 (e.g., L1 message), or any combination thereof. As noted previously herein, in some cases, the MAC-CE 420 and the RRC message 415 may be received via a same PDSCH message and/or via different PDSCH messages.

The RRC message 415 transmitted via the PCell 410-*a* may initiate configuration and activation of the SCell 410-*b* at the UE 115-*c*. In this regard, the RRC message 415 may initiate an RRC configuration and/or reconfiguration procedure for activating the second serving cell (e.g., SCell 410-*b*) at the UE 115-*c* during a time interval $T_{RRC\_Process}$ The UE 115-*c* may transmit an RRC response message 425 (e.g., RRC complete message) in response to the RRC message 415. The RRC response message 425 may indicate an acknowledgment of the RRC message 415 and/or the configuration/activation of the SCell 410-*b*.

In some aspects, the RRC response message 425 may be transmitted following a time interval $T_1$, which defines a delay from slot $$n + \frac{T_{RRC\_Process}}{NR \text{ Slot Length}}.$$

A duration of time interval $T_1$ may be based on a complexity and capability of the UE 115-*c*, and may therefore be UE-implementation dependent. In cases where the UE 115-*c* performs a handover (e.g., handover between PCells 410 during the SCell 410-*b* activation), the time interval $T_1$ may be replaced by time interval $T_{interrupt}+T_2+T_3$. In such cases, $T_{interrupt}+T_2+T_3$ may define delays or interruptions of the SCell 410-*b* activation which are attributable to the handover. In some aspects, the MAC-CE 420 may be received within $T_{RRC\_Process}$, $T_1$, or both.

In some cases, depending on the periodicity of SSBs 450 on the SCell 410-*b* and a relative timing of the SSBs 450, the SCell 410-*b* may transmit/broadcast an SSB 450 (e.g., SSB 450-*b*) prior to transmission of the RRC response message 425 (e.g., before $T_{RRC\_Process}$, within $T_{RRC\_Process}$, within $T_1$). However, the UE 115-*c* may be unable to receive/process the SSB 450-*a* received prior to an activation time interval $T_{ActivationTime}$ which follows the RRC response message 425. As such, for wireless communications systems which do not utilize the reference signal 435 described herein, the UE 115-*c* may have to wait until the next SSB 450-*b* to perform time/frequency tacking and AGC for activation of the SCell 410-*b*. Accordingly, techniques described herein which configure the reference signal 435 may reduce a latency of time/frequency tracking and/or AGC at the UE 115-*c*, which may reduce a latency of SCell 410-*b* activation. The activation time interval $T_{ActivationTime}$ may be occur following transmission of the RRC response message 425. In some aspects, the reference signal 435 may be received within the activation time interval $T_{ActivationTime}$ in the time domain. The term $T_{TempRS}$ may define a duration from the transmission of the RRC response message 425 and the reception of the reference signal 435. As such, $T_{FirstSSB} < T_{ActivationTime}$. In some aspects, the UE 115-*c* may receive the DCI message 430 (e.g., L1 message) within $T_{ActivationTime}$. As noted previously herein, the activation time interval $T_{ActivationTime}$ may end after some delay (e.g., 2-3 ms) following reception of the reference signal 435.

Upon receiving the reference signal 435, the UE 115-*c* may perform time and frequency tracking and/or AGC for activation of the SCell 410-*b* based on the reference signal 435. For example, the reference signal 435 may be used for time and frequency tracking and/or AGC during activation of the SCell 410-*b*. In this regard, the UE 115-*c* may be configured to perform measurements and/or adjust time tracking and/or frequency tracking for the second serving cell (e.g., SCell 410-*b*) based on receiving the reference signal 435 via the SCell 410-*b*.

Upon performing time/frequency tracking and/or AGC for the SCell 410-*b* based on the reference signal, and after an end of the activation time interval $T_{ActivationTime}$, the UE 115-*c* may be able to perform CSI reporting procedures with the SCell 410-*b* during a CSI reporting time interval $T_{CSI\_Reporting}$ In other words, $T_{CSI\_Reporting}$ may define a delay until the first available CSI report including uncertainties of CSI-RS resources and CSI reports.

For example, as shown in FIG. 4, the UE 115-*c* may receive a CSI-RS 440 via the SCell 410-*b* following an end of $T_{CSI\_Reporting}$ The UE 115-*c* may receive the CSI-RS 440 based on performing the time and frequency tracking (e.g., AGC) for activation of the SCell 410-*b* based on the reference signal 435. The UE 115-*c* may be configured to perform measurements on the received CSI-RS 440 for CSI reporting. Subsequently, the UE 115-*c* may transmit a CSI report 445 via the SCell 410-*b*. In particular, the UE 115-*c* may transmit the CSI report 445 based on performing measurements on the CSI-RS 440. In this regard, the CSI report 240 transmitted to the SCell 410-*b* may include an indication of the measurements performed on the CSI-RS 440.

As shown in FIG. 4, in some cases, the CSI reporting (e.g., reception of CSI-RS 440, transmission of CSI report 445) may be performed prior to the first SSB 450-*b* which is capable of being received/processed by the first UE 115-*c*. In this regard, techniques described herein may enable the UE 115-*c* to perform CSI reporting earlier as compared to some conventional SCell activation techniques, which may expedite activation of the SCell 410-*b* and improve user experience at the UE 115-*c*.

Figure 5:
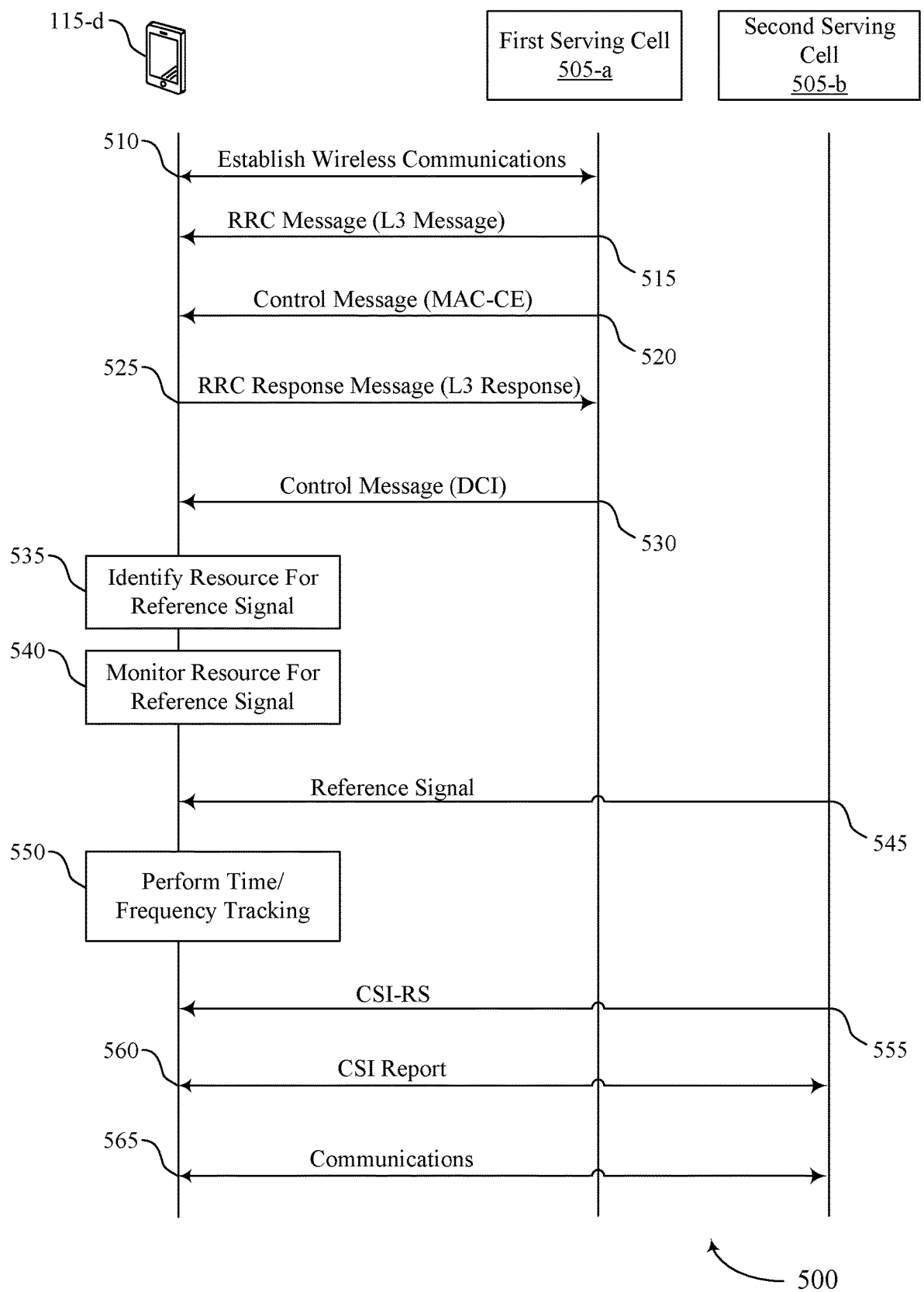
FIG. 5 illustrates an example of a process flow that supports techniques for direct SCell activation using temporary reference signals in accordance with aspects of the present disclosure.

FIG. 5 illustrates an example of a process flow 500 that supports techniques for direct SCell activation using temporary reference signals in accordance with aspects of the present disclosure. In some examples, process flow 500 may implement, or be implemented by, aspects of wireless communications system 100, wireless communications system 200, resource configuration 300, resource configuration 400, or any combination thereof.

The process flow 500 may include a UE 115-*d*, a first serving cell 505-*a*, and a second serving cell 505-*b*, which may be examples of UEs 115 and serving cells 205 as described with reference to FIGS. 1 and 2. In particular, the first serving cell 505-*a* and the second serving cell 505-*b* illustrated in FIG. 5 may include examples the first serving cell 205-*a* and the second serving cell 205-*b* illustrated in FIG. 2, respectively. In this regard, the first serving cell 505-*a* may be an example of an PCell, and the second serving cell 505-*b* may be an example of an SCell which is activated at the UE 115-*d* by the PCell. In some aspects, the first serving cell 505-*a* and the second serving cell 505-*b* may be associated with (e.g., supported by) a single network entity 105 of a wireless communications system (e.g., network entity 105-*a* illustrated in FIG. 2). Additionally, or alternatively, the first serving cell 505-*a* and the second serving cell 505-*b* may be associated with (e.g., supported by) different network entities 105.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 510, the UE 115-d may establish wireless communications with the first serving cell 505-a. In some aspects, the UE 115-d may establish the wireless communications with the first serving cell 505-a by initiating or otherwise performing a setup procedure with the first serving cell 505-a. In some aspects, the first serving cell 505-a and the second serving cell 505-b may be associated with the same frequency band (e.g., intra-band carrier aggregation). In some aspects, the first serving cell 505-a, the second serving cell 505-b, or both, may include a PCell, an SCell, a PSCell of an SCG, or any combination thereof. For example, in cases where the first serving cell 505-a includes a PCell, the second serving cell 505-b may include an SCell. The first serving cell 505-a and the second serving cell 505-b may be supported by the same network entity 105 or different network entities 105.

At 515, the UE 115-d may receive, via the first serving cell 505-a, an RRC message (e.g., L3 message) including an indication to activate the second serving cell 505-b. In this regard, the RRC message may initiate an RRC configuration and/or reconfiguration procedure for activating the second serving cell 505-b at the UE 115-d.

In some aspects, the RRC message may trigger a reference signal on the second serving cell 505-b for SCell activation. In this regard, the RRC message may directly activate the second serving cell 505-b, and may activate the reference signal on the second serving cell 505-b. For example, the RRC message may include an indication of a resource (or set of resources) for a reference signal on the second serving cell 505-b which will be used to facilitate SCell activation.

As noted previously herein, the reference signal on the second serving cell 505-b may be used to perform time and frequency tracking and/or AGC during activation of the second serving cell 505-b. The reference signal may include a temporary reference signal, a tracking reference signal, an NZP-CSI-RS, an SSB, or any combination thereof. For example, the temporary reference signal triggered by the RRC message may include one or multiple NZP-CSI-RS resource sets, where each NZP-CSI-RS resource set includes one or multiple NZP-CSI-RS resources labeled as trs-info.

The RRC message may indicate one or more parameters associated with the reference signal on the second serving cell 505-b. Parameters associated with the reference signal which may be indicated via the RRC message may include a structure of the reference signal, a component carrier for the reference signal, a BWP for the reference signal, TCI states for the reference signal, QCL configurations (e.g., QCL assumptions) for the reference signal, or any combination thereof. For example, the RRC message may indicate a structure/type of reference signal, which component carrier(s) are associated with the triggered reference signal, and/or which BWP(s) are associated with the triggered reference signal within the indicated component carriers. By way of another example, the RRC message may indicate one or more TCI states (e.g., one or more active TCI states) associated with the second serving cell 505-b which may be used to transmit the triggered reference signal. For instance, the RRC message may indicate TCI information and/or QCL information which indicates which reference signal the NZP-CSI-RS resources are QCLed with, and whether the QCL source reference signal may include an SSB or other NZP-CSI-RS resource.

At 520, the UE 115-d may receive an additional control message (e.g., additional control signaling) via the first serving cell 505-a. For example, the UE 115-d may receive a MAC-CE or other L2 message via the first serving cell 505-a following reception of the RRC message at 515.

In some aspects, the control message (e.g., MAC-CE, L2 message) received at 520 may include an indication of the resource for the reference signal on the second serving cell 505-b. Additionally, or alternatively, the control message may indicate one or more parameters associated with the reference signal on the second serving cell 505-b (e.g., structure, component carrier, BWP, TCI states, QCL configurations). In this regard, the resource(s) and/or other parameters for the reference signal on the second serving cell 505-b may be indicated via the RRC message (e.g., L3 message) at 515, via the control message (e.g., MAC-CE, L2 message) at 520, or both.

At 525, the UE 115-d may transmit, via the first serving cell 505-a, an RRC response message (e.g., RRC complete message, L3 response message). In some aspects, the UE 115-d may transmit the RRC response message in response to the RRC message at 515. The RRC response message may indicate a completion of the RRC configuration/reconfiguration procedure which was triggered by the RRC message at 515. As such, the transmission of the RRC response message may indicate an end of $T_{RRC\_Process}$ time interval, and a beginning of an activation time interval $T_{ActivationTime}$ for activating the second serving cell 505-b. Additionally, or alternatively, the UE 115-d may transmit the RRC response message at 525 based on receiving the control message (e.g., MAC-CE, L2 message) at 520.

At 530, the UE 115-d may receive an additional control message (e.g., additional control signaling) via the first serving cell 505-a. For example, the UE 115-d may receive a DCI message or other L1 message via the first serving cell 505-a. In some aspects, the UE 115-d may receive the control message (e.g., DCI message) at 530 following transmission of the RRC response message at 525. In particular, the UE 115-d may receive the DCI message at 530 within the activation time interval ($T_{ActivationTime}$) following the transmission of the RRC response message. In this regard, the UE 115-d may receive the control message (e.g., DCI message, L1 message) at 530 based on receiving the RRC message at 515, receiving the control message (e.g., MAC-CE, L2 message) at 520, transmitting the RRC response message at 525, or any combination thereof.

In some aspects, the control message (e.g., DCI message, L1 message) received at 530 may include an indication of the resource for the reference signal on the second serving cell 505-b. Additionally, or alternatively, the control message (e.g., DCI message, L1 message) received at 530 may indicate one or more parameters associated with the reference signal on the second serving cell 505-b (e.g., structure, component carrier, BWP, TCI states, QCL configurations). In this regard, the resource(s) and/or other parameters for the reference signal on the second serving cell 505-b may be indicated via the RRC message (e.g., L3 message) received at 515, via the control message (e.g., MAC-CE, L2 message) received at 520, via the control message (e.g., DCI message, L1 message) received at 530, or any combination thereof.

At 535, the UE 115-d may identify the resource for the reference signal which is to be received via the second serving cell 505-b. The UE 115-d may identify the resource for the reference signal within the activation time interval following the transmission of the RRC response message (e.g., RRC complete message, L3 response message) transmitted at 525. In this regard, the UE 115-*d* may identify the resource for the reference signal associated with time and frequency tracking for the second serving cell 505-*b* at 535 based on receiving the RRC message at 515, receiving the control message (e.g., MAC-CE, L2 message) at 520, transmitting the RRC response message at 525, receiving the control message at 530, or any combination thereof.

Additionally, or alternatively, the UE 115-*d* may identify one or more parameters (e.g., structure, component carrier, BWP, TCI states, QCL configurations) associated with the reference signal. The UE 115-*d* may identify the resource(s) and/or other parameters for the reference signal based on the higher-layer configuration and trigger signaling (e.g., RRC message, MAC-CE, DCI message) received via the first serving cell 505-*a*. In other words, the resource and other parameters for the reference signal for the second serving cell 505-*b* may be provided to the UE 115-*b* by the trigger signaling, preliminarily provided to the UE 115-*d* via earlier RRC configurations or signaling, via signaling which triggers the reference signal, or any combination thereof.

At 540, the UE 115-*d* may monitor the resource for the reference signal on the second serving cell 505-*b*. In this regard, the UE 115-*d* may monitor the resource at 540 based on identifying the resource and/or other parameters (e.g., structure, component carrier, BWP, TCI states, QCL configurations) associated with the reference signal at 535. Moreover, the UE 115-*b* may monitor the resource for the reference signal at 540 based on receiving the RRC message at 515, receiving the control message (e.g., MAC-CE, L2 message) at 520, transmitting the RRC response message at 525, receiving the control message at 530, or any combination thereof.

In some cases, the UE 115-*d* may assume that a TCI state (e.g., QCL configuration or QCL assumption) of the reference signal to be transmitted by the second serving cell 505-*b* may be selected from a set of active TCI states (or active QCL configurations), if sets of active TCI states/QCL configurations have been configured. In other words, the second serving cell 505-*b* may not transmit the reference signal with a TCI state (or QCL configuration) which is not in a configured active set of TCI states/QCL configurations.

For example, as noted previously herein, the UE 115-*d* may receive an indication of a set of active TCI states and/or active QCL configurations via the RRC message received at 515, via the control message (e.g., MAC-CE) received at 520, via the control message (e.g., DCI message) received at 530, or any combination thereof. In other words, the set of active TCI states may be activated by the RRC message which directly activates the SCell (e.g., second serving cell 505-*b*), via the MAC-CE of the PDSCH carrying the RRC message which directly activates the SCell, via a DCI message which directly activates the SCell, or any combination thereof. In this example, the UE 115-*d* may assume that the reference signal will be transmitted in accordance with one of the active TCI states/active QCL configurations, and may monitor the resource for the reference signal based on (e.g., in accordance with) one or more of the active TCI states and/or active QCL configurations.

At 545, the UE 115-*d* may receive the reference signal (e.g., temporary reference signal, tracking reference signal, NZP-CSI-RS, SSB) via the second serving cell 505-*b*. The UE 115-*d* may receive the reference signal within the resource for the reference signal identified at 535, and based on monitoring the resource at 540. Additionally, the UE 115-*d* may receive the reference signal in accordance with the one or more parameters (e.g., structure, component carrier, BWP, active TCI state, active QCL configuration) for the reference signal which were determined at 535. In some aspects, the UE 115-*d* may receive the reference signal at 545 prior to an earliest SSB which the UE 115-*d* is capable of receiving via the second serving cell 505-*b*.

At 550, the UE 115-*d* may perform time and frequency tracking for the second serving cell 505-*b*. The UE 115-*d* may perform time/frequency tracking during activation of the second serving cell 505-*b* based on receiving the reference signal via the second serving cell 505-*b* at 534.

For example, the reference signal may be used by the UE 115-*d* to perform time and frequency tracking (e.g., AGC) during activation of the second serving cell 505-*b*. In this regard, the UE 115-*d* may be configured to perform measurements and/or adjust time tracking and/or frequency tracking for the second serving cell 505-*b* based on receiving the reference signal at 545.

At 555, the UE 115-*d* may receive a CSI-RS via the second serving cell 505-*b*. The UE 115-*d* may receive the CSI-RS at 555 based on performing the time and frequency tracking (e.g., AGC) for activation of the second serving cell 505-*b* at 550. The UE 115-*b* may be configured to perform measurements on the received CSI-RS for CSI reporting.

At 560, the UE 115-*d* may transmit a CSI report via the second serving cell 505-*b*. In particular, the UE 115-*d* may transmit the CSI report at 555 based on performing measurements on the CSI-RS received at 555. In this regard, the CSI report transmitted to the second serving cell 505-*b* at 560 may include an indication of the measurements performed on the CSI-RS received at 555.

At 565, the UE 115-*d* may communicate with the second serving cell 505-*b*. The UE 115-*d* may communicate with the second serving cell 505-*b* based on performing the time and frequency tracking at 550 based on the reference signal. Additionally, or alternatively, the UE 115-*d* may communicate with the second serving cell 505-*b* based on receiving the CSI-RS at 555, transmitting the CSI report at 560, or both.

Techniques described herein may provide for improved wireless communications by improving direct SCell activation using (e.g., RRC signaling). In particular, techniques described herein may provide signaling and other configurations which enable the network to indicate sets of resources and other parameters for temporary reference signals used for SCell activation via RRC signaling. By enabling the UE 115-*d* to identify resources for temporary reference signals using RRC signaling, techniques described herein may reduce a time required for SCell activation relative to SCell activation schemes that do not use temporary reference signals. Additionally, techniques described herein may re-use (or re-purpose) fields within existing control signaling used for the SCell activation (e.g., reuse fields within uplink DCI messages which schedule RRC response messages for SCell activation), which may enable direct SCell activation without increasing control signaling used for SCell activation.

Figure 6:
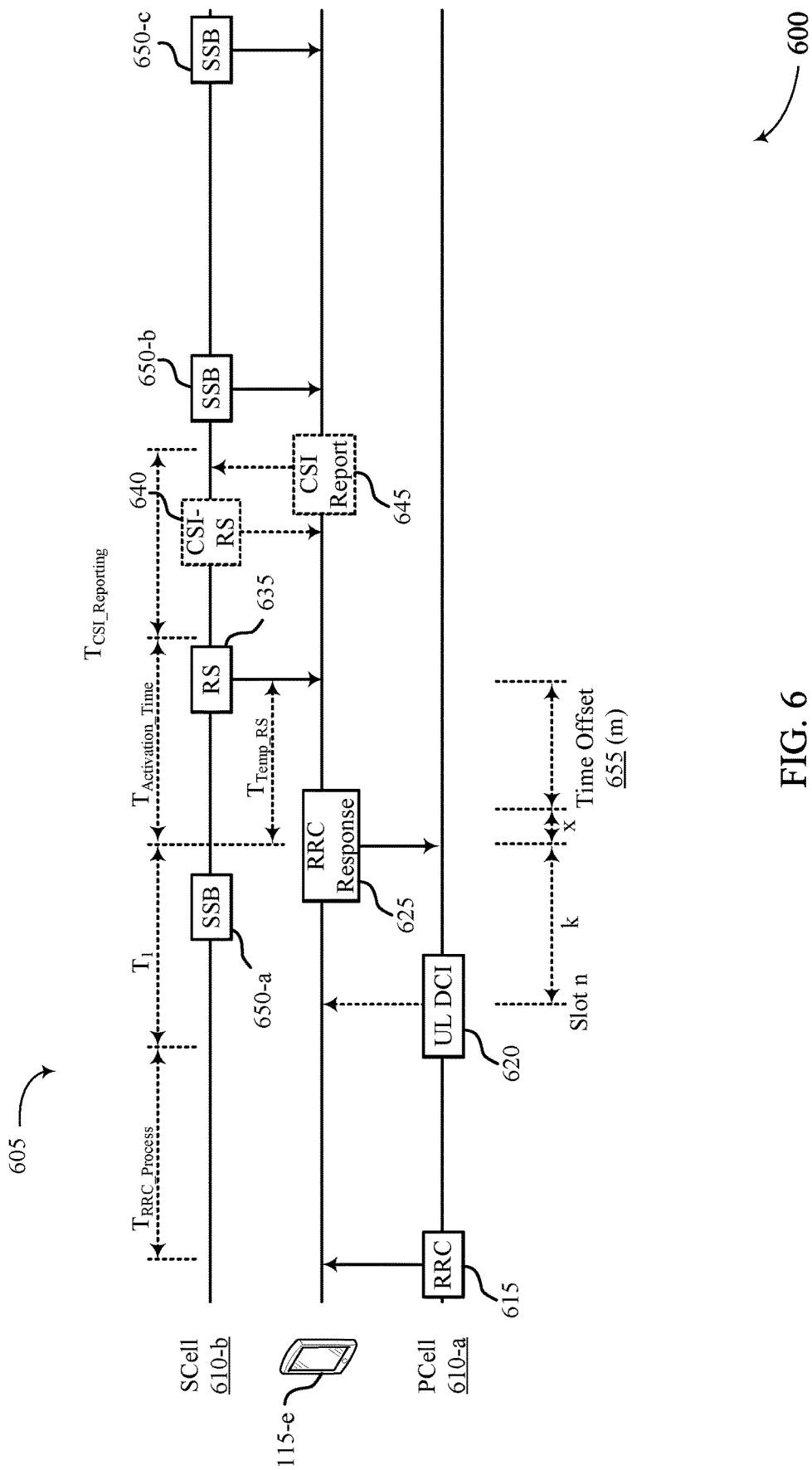
FIG. 6 illustrates an example of a resource configuration that supports techniques for direct SCell activation using temporary reference signals in accordance with aspects of the present disclosure.

FIG. 6 illustrates an example of a resource configuration 600 that supports techniques for direct SCell activation using temporary reference signals in accordance with aspects of the present disclosure. The resource configuration 600 may implement, or be implemented by, aspects of wireless communications system 100, wireless communications system 200, resource configuration 300, resource configuration 400, process flow 500, or any combination thereof.

The resource configuration 600 includes an SCell activation scheme 605 which illustrates a direct SCell activation procedure which utilizes RRC (e.g., L3) signaling. As noted previously herein, techniques for direct SCell activation using RRC signaling and temporary reference signals may reduce how long it takes for a UE 115 to perform SCell activation relative to SCell activation schemes that do not use temporary reference signals.

For example, as shown in FIG. 6, a UE 115-e may be communicatively coupled to a PCell 610-a (e.g., first serving cell), where the PCell 610-a initiates activation of an SCell 610-b (e.g., second serving cell) at the UE 115-e. As noted previously herein, the SCell activation delay (SCell$_{ActivationDelay}$, or N$_{Direct}$) for activation of the SCell 610-b at the UE 115-e may be represented as T$_{RRC\_Process}$+T$_1$+ T$_{activation\_time}$+T$_{CSI\_Reporting}$−3 ms.

The SCell 610-b may transmit SSBs 650 (e.g., SSBs 650-a, 650-b, 650-c) at an SSB periodicity. According to some conventional techniques, SSBs 650 may be used by the UE 115-e for time/frequency tracking, AGC, or both, during activation of the SCell 610-b. However, use of the SSBs 650 for time/frequency tracking may result in increased latency for SCell 610-b activation.

Accordingly, as described herein, the SCell activation scheme 605 illustrated in FIG. 6 may utilize a reference signal 635 to facilitate direct SCell activation (e.g., fast SCell activation) at the UE 115-e. The reference signal 635 may be used for time and frequency tracking and/or AGC during activation of the SCell 610-b to expedite SCell activation at the UE 115-e. The reference signal 635 may include a temporary reference signal, a tracking reference signal, one or a set of NZP-CSI-RS resources, a temporary/aperiodic SSB, or any combination thereof. In particular, the UE 115-e may receive the reference signal 635 prior to a first SSB 650 (e.g., SSB 650-b) which may be received/processed by the UE 115-e via the SCell 610-b. In this regard, the use of the reference signal 635 may reduce a time it takes for the UE 115-e to perform time/frequency tracking for the SCell 610-b, which may expedite CSI reporting and communications between the UE 115-e and the SCell 610-b.

In some aspects, the UE 115-e may receive an RRC message 615 (e.g., L3 message) via the PCell 610-a, where the RRC message 615 includes an indication to activate the SCell 610-b. In this regard, the RRC message 615 may initiate an RRC configuration and/or reconfiguration procedure for activating the SCell 610-b at the UE 115-e during a time interval T$_{RRC\_Process}$.

Additionally, the UE 115-e may receive a DCI message 620 in an uplink DCI format that schedules a physical uplink shared channel (PUSCH) message carrying an RRC reconfiguration complete message (and/or RRC reconfiguration complete message) responsive to the RRC message 615. For example, as shown in FIG. 6, the UE 115-e may receive an uplink DCI message 620 which indicates a resource for transmitting an RRC response message 625 (e.g., RRC configuration/reconfiguration complete message) responsive to the RRC message 615. In this regard, the DCI message 620 may indicate time/frequency resources which are usable by the UE 115-e for transmitting the RRC response message 625 in response to the RRC message 615.

In some aspects, the DCI message 620 may additionally or alternatively indicate an activation of a reference signal associated with time and frequency tracking for the SCell 610-b. In other words, the DCI message 620 may trigger or activate the reference signal 635 which will be used for time and frequency tracking for the SCell 610-b. For example, the reference signal 635 associated with the SCell 610-b may be triggered/activated via one or more A-CSI request fields within the DCI message 620. Accordingly, because the DCI message 620, which is used to indicate time/frequency resources which are usable by the UE 115-e for transmitting the RRC response message 625, is also used to indicate an activation of a reference signal (e.g., reference signal 635) associated with time and frequency tracking for SCell 610-b, additional control signaling messages to indicate the activation of the reference signal can be avoided and control signaling overhead is not increased. In other words, by re-using (or re-purposing) existing signaling used for SCell activation (namely, the DCI message 620), techniques described herein may enable direct SCell activation using temporary reference signals without increasing control signaling overhead.

In some cases, the DCI message 620 may indicate or select the activated reference signal 635 and/or the activated reference signal resource from a set of candidate reference signals/resources which may be used for SCell activation at the UE 115-e. In particular, configurations, resources, and timing offsets of candidate reference signals on the to-be-activated SCell 610-b may be configured by higher-layer signaling, where the DCI message 620 selects or otherwise indicates which configuration/resource/timing offset is to be used. For example, the RRC message 615 (or other control signaling) may indicate a set of candidate reference signal resources (or set of candidate reference signal configurations/offsets) which may be used for activating serving cells at the UE 115-e. In this example, the DCI message 620 may indicate which reference signal resource (e.g., which reference signal configuration/offset) of the set of candidate reference signal resources on the SCell 610-b is to be used. For instance, the A-CSI request field of the DCI message 620 may indicate which temporary reference signal resource from the set of candidate reference signal resources is triggered/activated on SCell 610-b.

In some aspects, the DCI message 620 may indicate a resource or relative timing for the reference signal 635. In some cases, the DCI message 620 may expressly indicate time/frequency resources which are to be used for transmitting/receiving the reference signal 635. In additional or alternative implementations, the exact timing of the reference signal 635 may be determined based on a number of factors or parameters including, but not limited to, a timing of the PUSCH message carrying the RRC reconfiguration complete message (e.g., timing of RRC response message 625), and a time offset 655 indicated via the DCI message 620 (e.g., indicated via the A-CSI request field of the DCI message 620).

For example, in some implementations, the DCI message 620 may indicate a time offset 655 associated with a resource allocated for the reference signal 635 on SCell 610-b. In particular, the DCI message 620 may indicate a time offset 655 which defines a quantity of slots/TTIs between transmission of the RRC response message 625 and the resource for the reference signal 635. In this example, the reference signal 635 may be triggered on/within slot n+k+x+m, where slot n is the slot (or TTI) in which the UE 115-e receives the DCI message 620 scheduling the RRC response message 625, k defines a number of slots/TTIs between slot n and the slot for transmitting/receiving the RRC response message 625, x is a pre-defined number of slots/TTIs (e.g., x=3 ms), and m (e.g., time offset 655) defines a number of slots/TTIs between slot n+k+x and the slot/TTI in which the reference signal 635 is triggered. In some cases, the value of x may be pre-configured, signaled by the network (e.g., via RRC message 625), or both. Thus, the timing of the reference signal 635 relative to the timing of the RRC response message 625 may be based on the value of x and the value of m (e.g., time offset 655), where the value of x may be pre-configured or signaled via the network, and the value of m (e.g., time offset 655) is indicated via the DCI message 620.

In some aspects, the slots/TTIs shown and described in FIG. 6 may be based on the SCS of the respective cells (e.g., SCS of PCell 610-*a*, SCS of SCell 610-*b*). The slots/TTIs may (or may not) be aligned across the PCell 610-*a* and the SCell 610-*b* depending on the SCS for each of the respective serving cells. In some aspects, the DCI message 620 may indicate the time offset 655 (e.g., indicate the value of m) based on the SCS of the PCell 610-*a*, the SCS of the SCell 610-*b*, or both.

In some aspects, a resource(s) and/or other parameters (e.g., structure, component carrier, BWP, TCI state, QCL configuration) for the reference signal 635 on the SCell 610-*b* may be indicated to the UE 115-*e* via higher-layer configuration and trigger signaling received via the PCell 610-*a*. For example, the resource for the reference signal 635 may be indicated via the RRC message 615 (e.g., L3 message), the DCI message 620 (e.g., L1 message), or both.

The UE 115-*e* may transmit the RRC response message 625 (e.g., RRC complete message) in response to the RRC message 615. The RRC response message 625 may indicate an acknowledgment of the RRC message 615 and/or the configuration/activation of the SCell 610-*b*. In particular, the UE 115-*e* may transmit the RRC response message 625 via the resource which was indicated via the DCI message 620. In other words, the UE 115-*e* may transmit the RRC response message 625 in accordance with the scheduling of the RRC response message 625 signaled via the DCI message 620.

In some aspects, the RRC response message 625 may be transmitted following a time interval $T_1$ (e.g., following k slots/TTIs), which defines a delay from slot $$n + \frac{T_{RRC\_Process}}{NR\ Slot\ Length}.$$

A duration of time interval $T_1$ may be based on a complexity and capability of the UE 115-*e*, and may therefore be UE-implementation dependent. In cases where the UE 115-*e* performs a handover (e.g., handover between PCells 610 during the SCell 610-*b* activation), the time interval $T_1$ may be replaced by time interval $T_{interrupt}+T_2+T_3$. In such cases, $T_{interrupt}+T_2+T_3$ may define delays or interruptions of the SCell 610-*b* activation which are attributable to the handover.

In some cases, depending on the periodicity of SSBs 650 on the SCell 610-*b* and a relative timing of the SSBs 650, the SCell 610-*b* may transmit/broadcast an SSB 650 (e.g., SSB 650-*b*) prior to transmission of the RRC response message 625 (e.g., before $T_{RRC\_Process}$, within $T_{RRC\_Process}$, within $T_1$). However, the UE 115-*e* may be unable to receive/process the SSB 650-*a* received prior to an activation time interval $T_{ActivationTime}$ which follows the RRC response message 625. As such, for wireless communications systems which do not utilize the reference signal 635 described herein, the UE 115-*e* may have to wait until the next SSB 650-*b* to perform time/frequency tacking and AGC for activation of the SCell 610-*b*.

Accordingly, techniques described herein which configure the reference signal 635 may reduce a latency of time/frequency tracking and/or AGC at the UE 115-*e*, which may reduce a latency of SCell 610-*b* activation. The activation time interval $T_{ActivationTime}$ may be occur following transmission of the RRC response message 625. In some aspects, the reference signal 635 may be received within the activation time interval $T_{ActivationTime}$ in the time domain. The term $T_{TempRS}$ may define a duration from the transmission of the RRC response message 625 and the reception of the reference signal 635. As such, $T_{FirstSSB} < T_{ActivationTime}$. In some aspects, the reference signal 635 may be transmitted/repeated multiple times (e.g., multiple reference signal bursts). For example, the UE 115-*e* may receive a first reference signal 635 (e.g., first reference signal burst) for AGC, and a second reference signal 635 (e.g., second reference signal burst) for time/frequency tracking.

Upon receiving the reference signal 635 on the SCell 610-*b*, the UE 115-*e* may perform time and frequency tracking and/or AGC for activation of the SCell 610-*b* based on the reference signal 635. For example, the reference signal 635 may be used for time and frequency tracking and/or AGC during activation of the SCell 610-*b*. In this regard, the UE 115-*e* may be configured to perform measurements and/or adjust time tracking and/or frequency tracking for the second serving cell (e.g., SCell 610-*b*) based on receiving the reference signal 635 via the SCell 610-*b*.

Upon performing time/frequency tracking and/or AGC for the SCell 610-*b* based on the reference signal, and after an end of the activation time interval $T_{ActivationTime}$, the UE 115-*e* may be able to perform CSI reporting procedures with the SCell 610-*b* during a CSI reporting time interval $T_{CSI\_Reporting}$ In other words, T CSI_Reporting may define a delay until the first available CSI report including uncertainties of CSI-RS resources and CSI reports.

For example, as shown in FIG. 6, the UE 115-*e* may receive a CSI-RS 640 via the SCell 610-*b* following an end of $T_{CSI\_Reporting}$ The UE 115-*e* may receive the CSI-RS 640 based on performing the time and frequency tracking (e.g., AGC) for activation of the SCell 610-*b* based on the reference signal 635. The UE 115-*e* may be configured to perform measurements on the received CSI-RS 640 for CSI reporting. Subsequently, the UE 115-*e* may transmit a CSI report 645 via the SCell 610-*b*. In particular, the UE 115-*e* may transmit the CSI report 645 based on performing measurements on the CSI-RS 640. In this regard, the CSI report 240 transmitted to the SCell 610-*b* may include an indication of the measurements performed on the CSI-RS 640.

As shown in FIG. 6, in some cases, the CSI reporting (e.g., reception of CSI-RS 640, transmission of CSI report 645) may be performed prior to the first SSB 650-*b* which is capable of being received/processed by the first UE 115-*e*. In this regard, techniques described herein may enable the UE 115-*e* to perform CSI reporting earlier as compared to some conventional SCell activation techniques, which may expedite activation of the SCell 610-*b* and improve user experience at the UE 115-*e*.

Techniques described herein may provide for improved wireless communications by improving direct SCell activation using RRC signaling (e.g., L3 signaling). In particular, techniques described herein may provide signaling and other configurations which enable the network to indicate sets of resources and other parameters for temporary reference signals used for SCell activation via RRC signaling. By enabling UEs 115 to identify resources for temporary reference signals using RRC signaling, techniques described herein may reduce a time required for SCell activation relative to SCell activation schemes that do not use temporary reference signals. Additionally, techniques described herein may re-use (or re-purpose) fields within existing control signaling used for the SCell activation (e.g., reuse fields within uplink DCI messages which schedule RRC response messages for SCell activation), which may enable direct SCell activation without increasing control signaling used for SCell activation.

Figure 7:
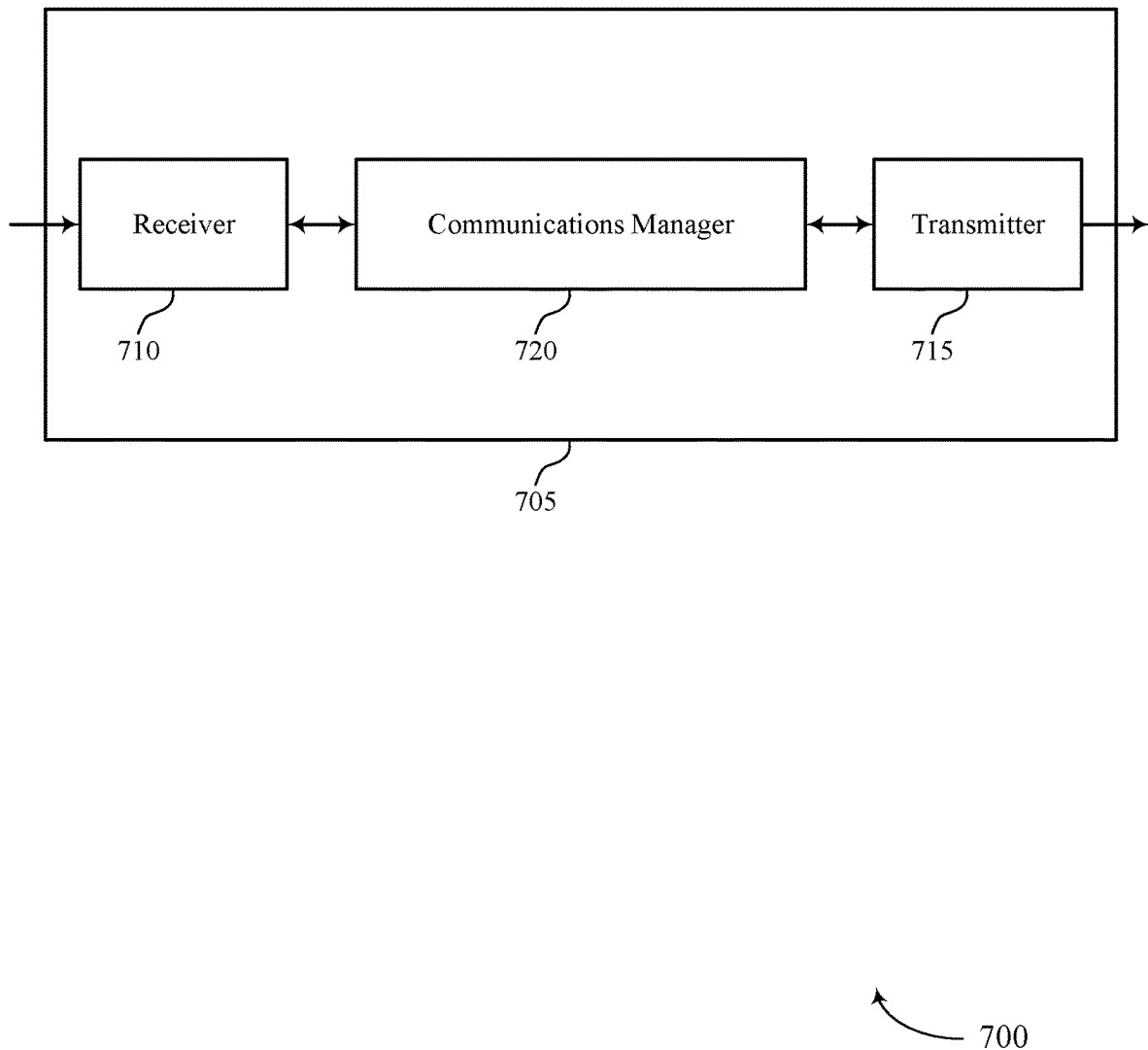
FIGS. 7 and 8 show block diagrams of devices that support techniques for direct SCell activation using temporary reference signals in accordance with aspects of the present disclosure.

FIG. 7 shows a block diagram 700 of a device 705 that supports techniques for direct SCell activation using temporary reference signals in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for direct SCell activation using temporary reference signals). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for direct SCell activation using temporary reference signals). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for direct SCell activation using temporary reference signals as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving, via a first serving cell, a message including an indication to activate a second serving cell different from the first serving cell. The communications manager 720 may be configured as or otherwise support a means for receiving, via the first serving cell, a control message indicating a first resource for transmitting a response message responsive to the message, and triggering a reference signal associated with time and frequency tracking for the second serving cell. The communications manager 720 may be configured as or otherwise support a means for transmitting, via the first serving cell and within the first resource indicated via the control message, the response message acknowledging the message. The communications manager 720 may be configured as or otherwise support a means for monitoring a second resource of the second serving cell for the reference signal based on the control message.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for improved wireless communications by improving direct SCell activation using RRC signaling (e.g., L3 signaling). In particular, techniques described herein may provide signaling and other configurations which enable the network to indicate sets of resources and other parameters for temporary reference signals used for SCell activation via RRC signaling. By enabling UEs 115 to identify resources for temporary reference signals using RRC signaling, techniques described herein may reduce a time required for SCell activation while reducing control signaling used for the SCell activation.

Figure 8:
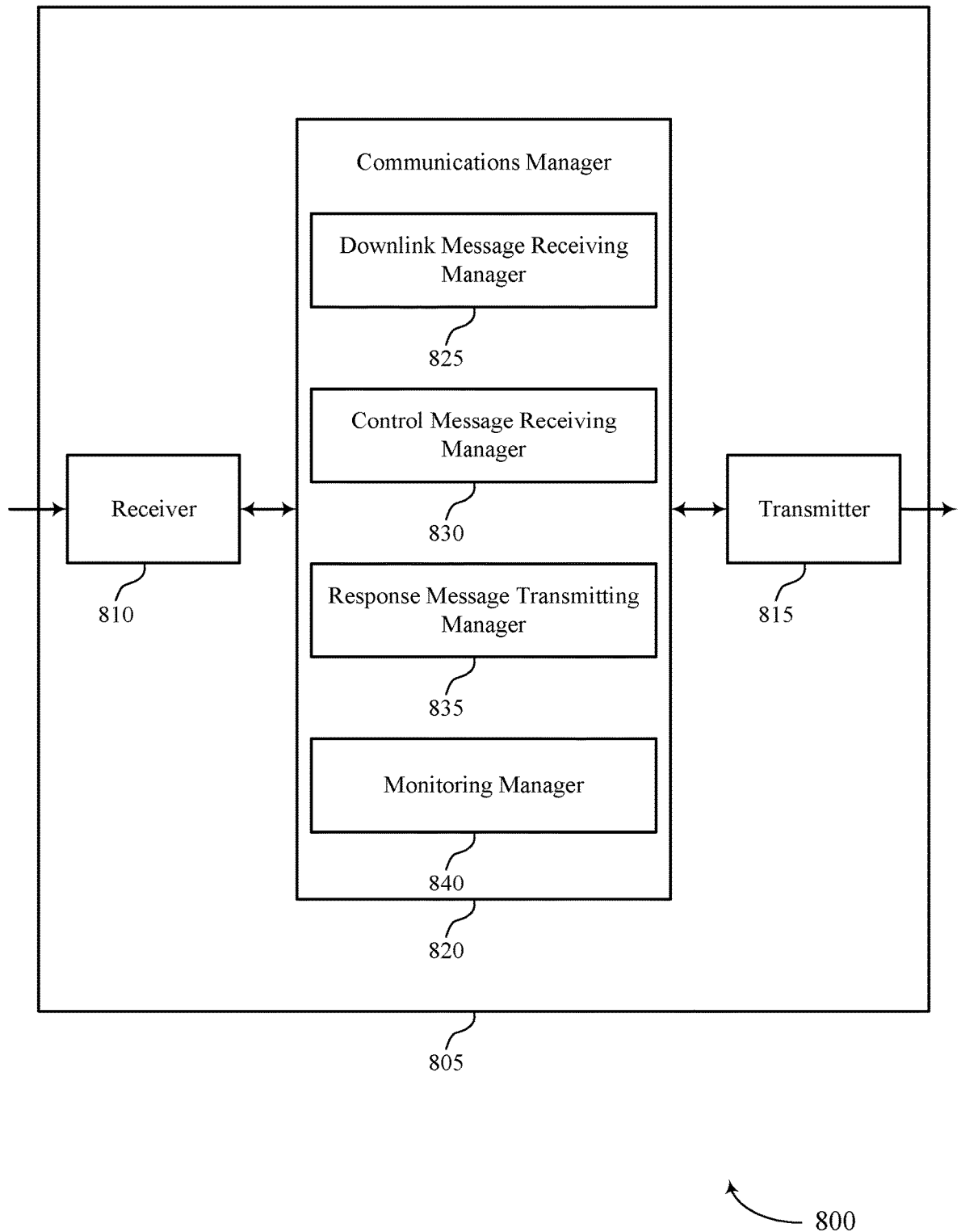

FIG. 8 shows a block diagram 800 of a device 805 that supports techniques for direct SCell activation using temporary reference signals in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for direct SCell activation using temporary reference signals). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for direct SCell activation using temporary reference signals). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for direct SCell activation using temporary reference signals as described herein. For example, the communications manager 820 may include a downlink message receiving manager 825, a control message receiving manager 830, a response message transmitting manager 835, a monitoring manager 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The downlink message receiving manager 825 may be configured as or otherwise support a means for receiving, via a first serving cell, a message including an indication to activate a second serving cell different from the first serving cell. The control message receiving manager 830 may be configured as or otherwise support a means for receiving, via the first serving cell, a control message indicating a first resource for transmitting a response message responsive to the message, and triggering a reference signal associated with time and frequency tracking for the second serving cell. The response message transmitting manager 835 may be configured as or otherwise support a means for transmitting, via the first serving cell and within the first resource indicated via the control message, the response message acknowledging the message. The monitoring manager 840 may be configured as or otherwise support a means for monitoring a second resource of the second serving cell for the reference signal based on the control message.

Figure 9:
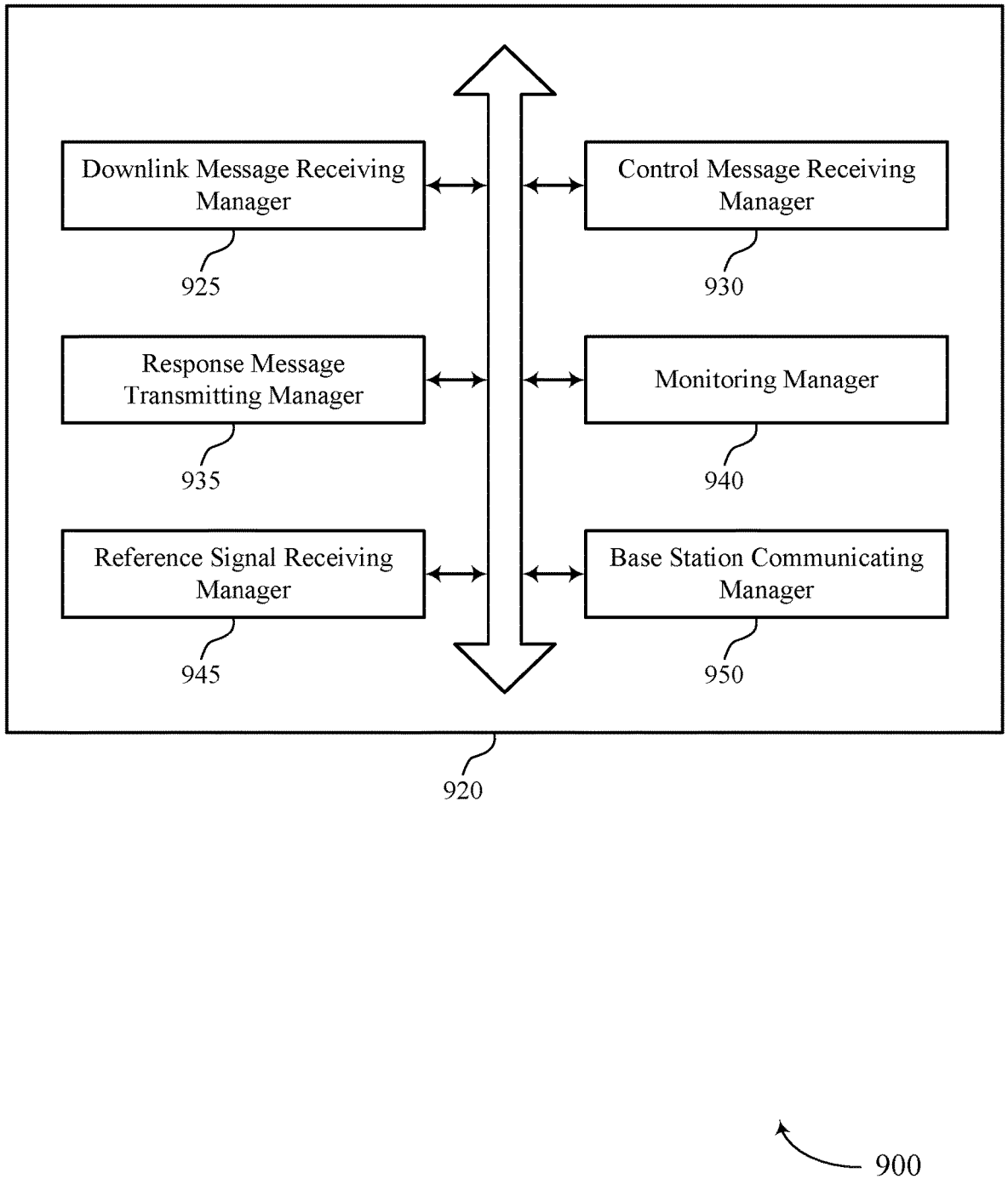
FIG. 9 shows a block diagram of a communications manager that supports techniques for direct SCell activation using temporary reference signals in accordance with aspects of the present disclosure.

FIG. 9 shows a block diagram 900 of a communications manager 920 that supports techniques for direct SCell activation using temporary reference signals in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for direct SCell activation using temporary reference signals as described herein. For example, the communications manager 920 may include a downlink message receiving manager 925, a control message receiving manager 930, a response message transmitting manager 935, a monitoring manager 940, a reference signal receiving manager 945, a network entity communicating manager 950, or any combination thereof. Each of these components may communicate, directly or indirectly, with one another (e.g., via one or more buses).

The communications manager 920 may support wireless communication at a UE in accordance with examples as disclosed herein. The downlink message receiving manager 925 may be configured as or otherwise support a means for receiving, via a first serving cell, a message including an indication to activate a second serving cell different from the first serving cell. The control message receiving manager 930 may be configured as or otherwise support a means for receiving, via the first serving cell, a control message indicating a first resource for transmitting a response message responsive to the message, and triggering a reference signal associated with time and frequency tracking for the second serving cell. The response message transmitting manager 935 may be configured as or otherwise support a means for transmitting, via the first serving cell and within the first resource indicated via the control message, the response message acknowledging the message. The monitoring manager 940 may be configured as or otherwise support a means for monitoring a second resource of the second serving cell for the reference signal based on the control message.

In some examples, the downlink message receiving manager 925 may be configured as or otherwise support a means for receiving, via the message, an indication of a set of multiple candidate reference signal resources. In some examples, the control message receiving manager 930 may be configured as or otherwise support a means for receiving, via the control message and based on the message, an indication of the second resource from the set of multiple candidate reference signal resources, where monitoring the second resource of the second serving cell for the reference signal is based on the indication of the second resource.

In some examples, the control message receiving manager 930 may be configured as or otherwise support a means for receiving, via the control message, an indication of a time offset associated with the second resource for the reference signal, where monitoring the second resource is based on the time offset. In some examples, the time offset indicates a period of time between the first resource and the second resource.

In some examples, the control message receiving manager 930 may be configured as or otherwise support a means for receiving, via the control message, an indication of the second resource for the reference signal, where monitoring the second resource is based on receiving the indication of the second resource. In some examples, the control message includes a DCI message. In some examples, the control message includes an A-CSI request field that triggers the reference signal associated with time and frequency tracking for the second serving cell.

In some examples, the downlink message receiving manager 925 may be configured as or otherwise support a means for receiving, via the message, the control message, or both, an indication of one or more parameters associated with the reference signal, where monitoring the second resource is based on the one or more parameters. In some examples, the one or more parameters include a structure of the reference signal, a component carrier for the reference signal, a BWP for the reference signal, or any combination thereof.

In some examples, the reference signal receiving manager 945 may be configured as or otherwise support a means for receiving the reference signal via the second serving cell based on the monitoring. In some examples, the network entity communicating manager 950 may be configured as or otherwise support a means for communicating with the second serving cell based on time and frequency tracking information determined using the reference signal. In some examples, the reference signal receiving manager 945 may be configured as or otherwise support a means for receiving, based on the reference signal, AGC information associated with the second serving cell, where communicating with the second serving cell is based on the AGC information.

In some examples, the reference signal is received prior to an earliest SSB which the UE is capable of receiving via the second serving cell. In some examples, the reference signal includes a temporary reference signal, a tracking reference signal, an NZP-CSI-RS, or any combination thereof.

Figure 10:
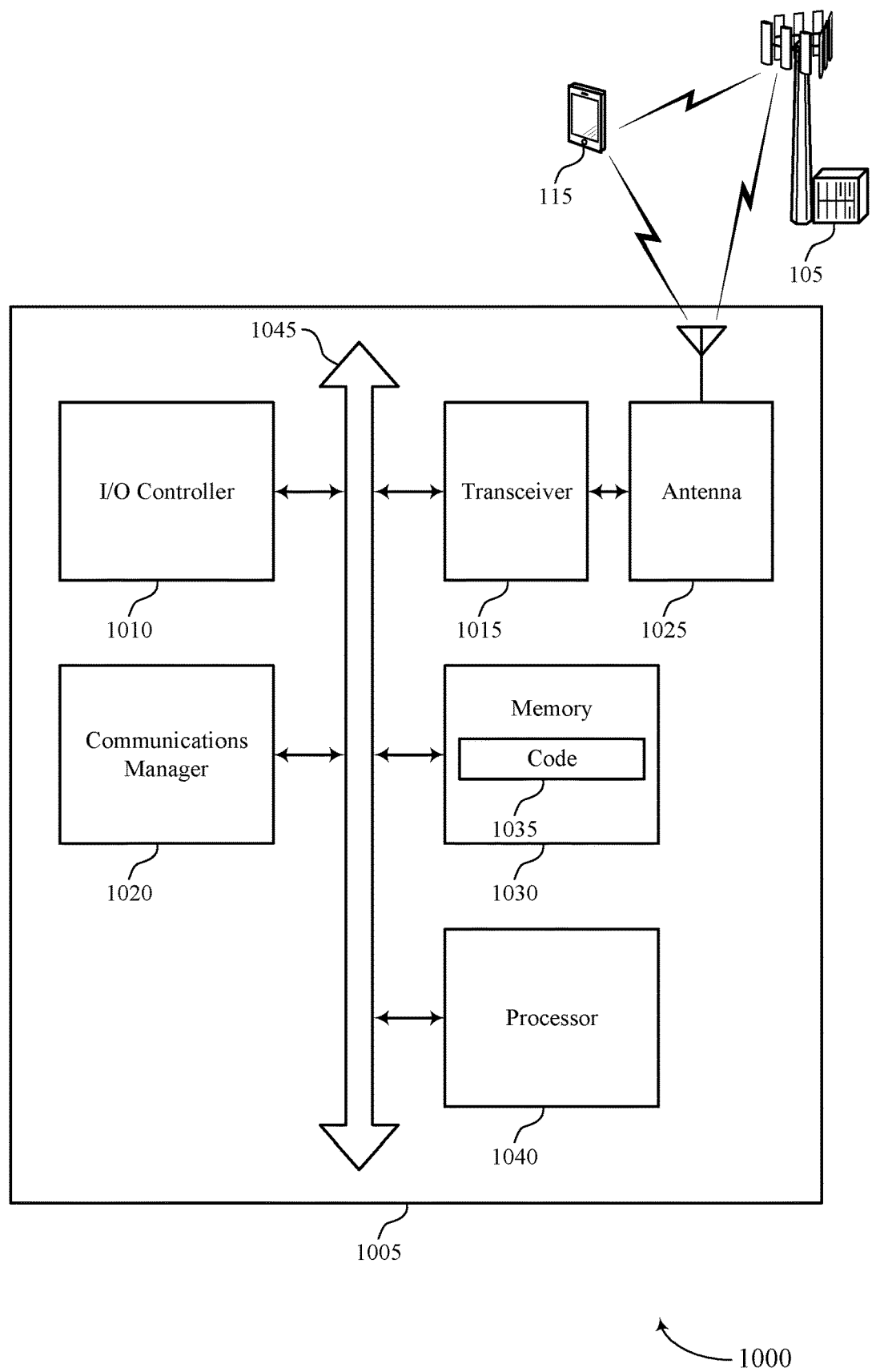
FIG. 10 shows a diagram of a system including a device that supports techniques for direct SCell activation using temporary reference signals in accordance with aspects of the present disclosure.

FIG. 10 shows a diagram of a system 1000 including a device 1005 that supports techniques for direct SCell activation using temporary reference signals in accordance with aspects of the present disclosure. The device 1005 may be an example of or include the components of a device 705, a device 805, or a UE 115 as described herein. The device 1005 may communicate wirelessly with one or more network entities 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for direct SCell activation using temporary reference signals). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, via a first serving cell, a message including an indication to activate a second serving cell different from the first serving cell. The communications manager 1020 may be configured as or otherwise support a means for receiving, via the first serving cell, a control message indicating a first resource for transmitting a response message responsive to the message, and triggering a reference signal associated with time and frequency tracking for the second serving cell. The communications manager 1020 may be configured as or otherwise support a means for transmitting, via the first serving cell and within the first resource indicated via the control message, the response message acknowledging the message. The communications manager 1020 may be configured as or otherwise support a means for monitoring a second resource of the second serving cell for the reference signal based on the control message.

By including or configuring the communications manager 1020 in accordance with examples as described herein, the device 1005 may support techniques for improved wireless communications by improving direct SCell activation using RRC signaling (e.g., L3 signaling). In particular, techniques described herein may provide signaling and other configurations which enable the network to indicate sets of resources and other parameters for temporary reference signals used for SCell activation via RRC signaling. By enabling UEs 115 to identify resources for temporary reference signals using RRC signaling, techniques described herein may reduce a time required for SCell activation while reducing control signaling used for the SCell activation.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for direct SCell activation using temporary reference signals as described herein, or the processor 1040 and the memory 1030 may be otherwise configured to perform or support such operations.

Figure 11:
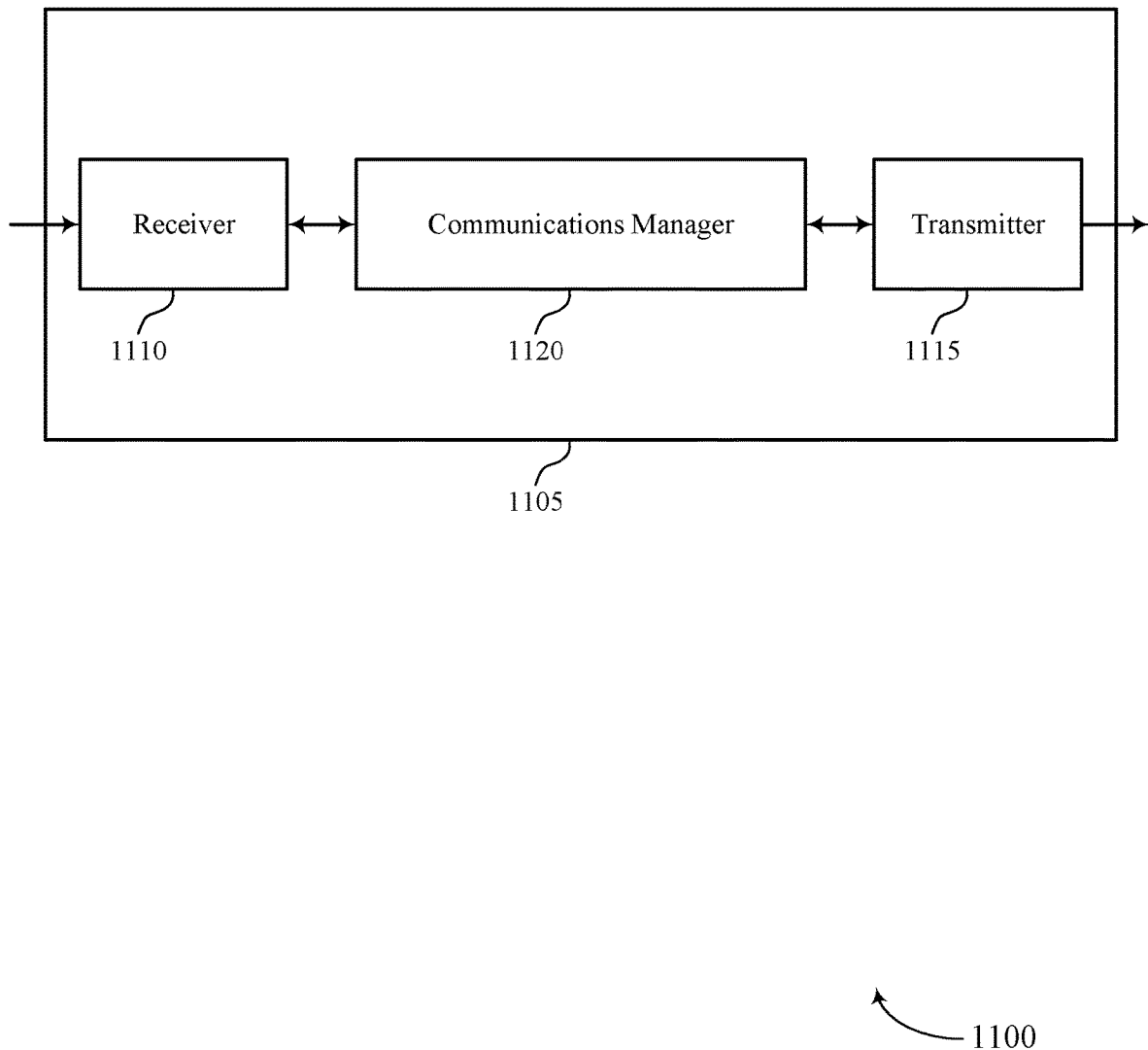
FIGS. 11 and 12 show block diagrams of devices that support techniques for direct SCell activation using temporary reference signals in accordance with aspects of the present disclosure.

FIG. 11 shows a block diagram 1100 of a device 1105 that supports techniques for direct SCell activation using temporary reference signals in accordance with aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for direct SCell activation using temporary reference signals). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for direct SCell activation using temporary reference signals). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for direct SCell activation using temporary reference signals as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a network entity in accordance with examples as disclosed herein. For example, the communications manager 1120 may be configured as or otherwise support a means for transmitting, to a UE via a first serving cell, a message including an indication to activate a second serving cell different from the first serving cell. The communications manager 1120 may be configured as or otherwise support a means for transmitting, to the UE via the first serving cell, a control message indicating a first resource for transmitting a response message responsive to the message, and triggering a reference signal associated with time and frequency tracking for the second serving cell. The communications manager 1120 may be configured as or otherwise support a means for receiving, from the UE via the first serving cell and within the first resource indicated via the control message, the response message acknowledging the message. The communications manager 1120 may be configured as or otherwise support a means for transmitting the reference signal to the UE within a second resource of the second serving cell based on the control message.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for improved wireless communications by improving direct SCell activation using RRC signaling (e.g., L3 signaling). In particular, techniques described herein may provide signaling and other configurations which enable the network to indicate sets of resources and other parameters for temporary reference signals used for SCell activation via RRC signaling. By enabling UEs 115 to identify resources for temporary reference signals using RRC signaling, techniques described herein may reduce a time required for SCell activation while reducing control signaling used for the SCell activation.

Figure 12:
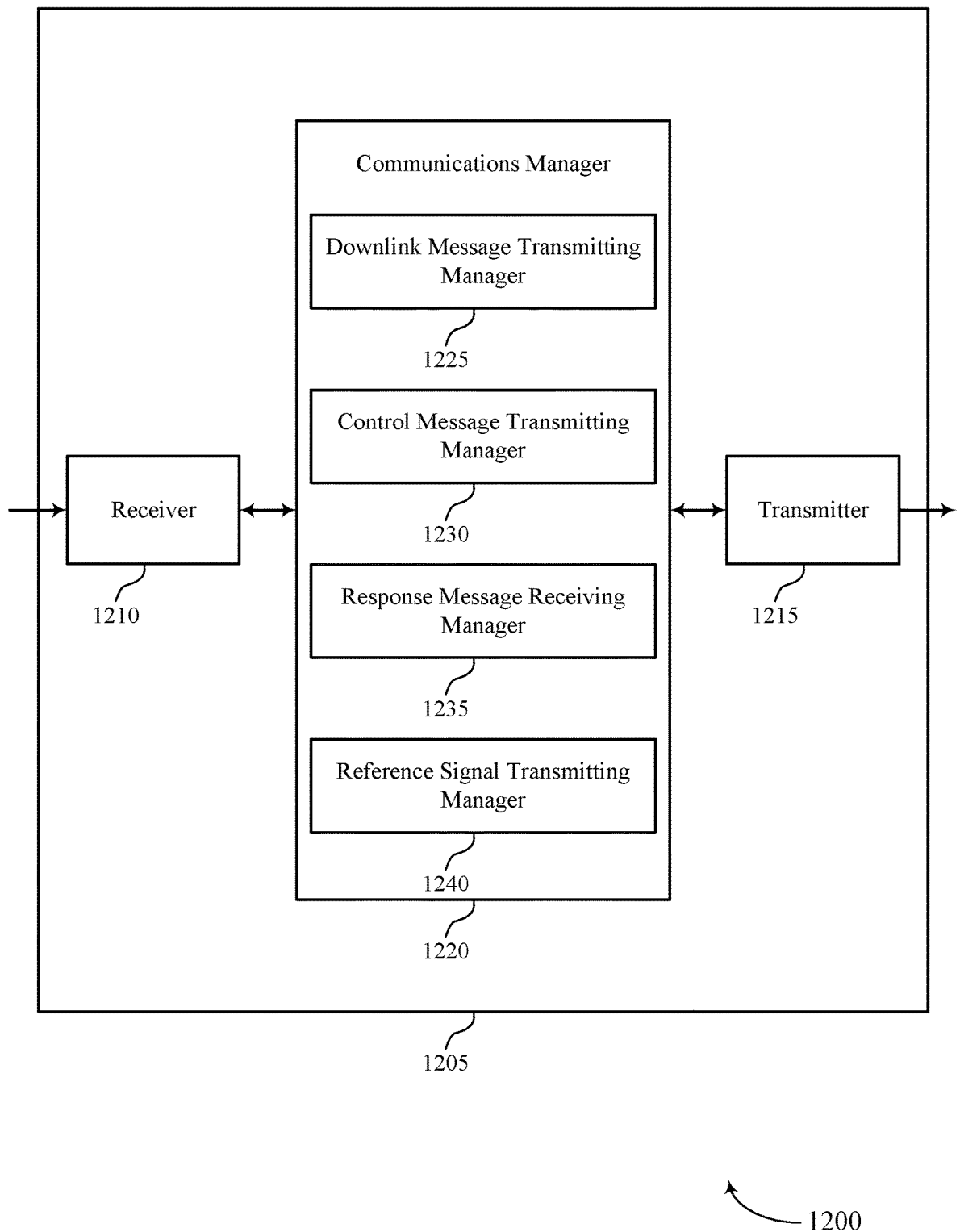

FIG. 12 shows a block diagram 1200 of a device 1205 that supports techniques for direct SCell activation using temporary reference signals in accordance with aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for direct SCell activation using temporary reference signals). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for direct SCell activation using temporary reference signals). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for direct SCell activation using temporary reference signals as described herein. For example, the communications manager 1220 may include a downlink message transmitting manager 1225, a control message transmitting manager 1230, a response message receiving manager 1235, a reference signal transmitting manager 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a network entity in accordance with examples as disclosed herein. The downlink message transmitting manager 1225 may be configured as or otherwise support a means for transmitting, to a UE via a first serving cell, a message including an indication to activate a second serving cell different from the first serving cell. The control message transmitting manager 1230 may be configured as or otherwise support a means for transmitting, to the UE via the first serving cell, a control message indicating a first resource for transmitting a response message responsive to the message, and triggering a reference signal associated with time and frequency tracking for the second serving cell. The response message receiving manager 1235 may be configured as or otherwise support a means for receiving, from the UE via the first serving cell and within the first resource indicated via the control message, the response message acknowledging the message. The reference signal transmitting manager 1240 may be configured as or otherwise support a means for transmitting the reference signal to the UE within a second resource of the second serving cell based on the control message.

Figure 13:
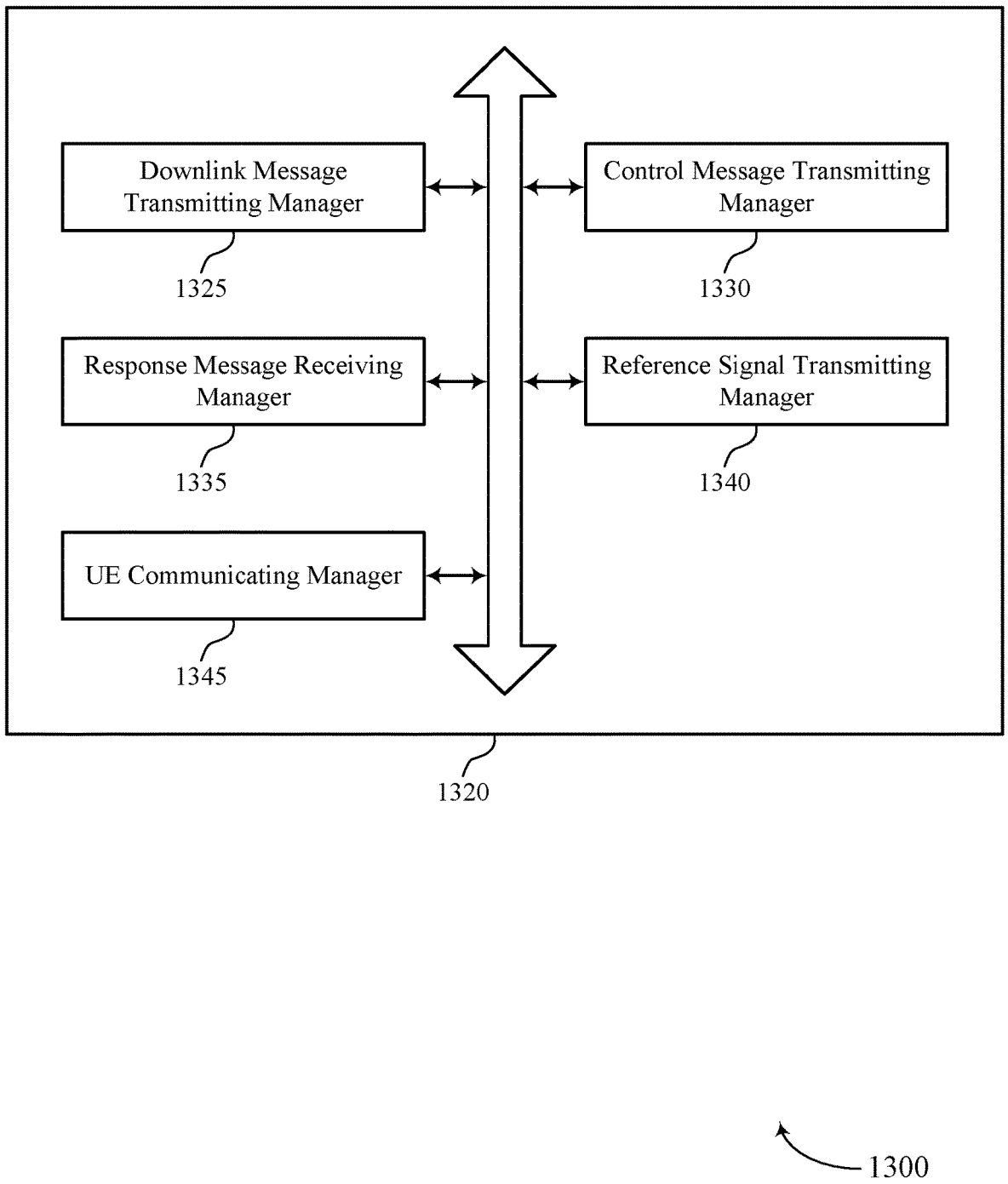
FIG. 13 shows a block diagram of a communications manager that supports techniques for direct SCell activation using temporary reference signals in accordance with aspects of the present disclosure.

FIG. 13 shows a block diagram 1300 of a communications manager 1320 that supports techniques for direct SCell activation using temporary reference signals in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for direct SCell activation using temporary reference signals as described herein. For example, the communications manager 1320 may include a downlink message transmitting manager 1325, a control message transmitting manager 1330, a response message receiving manager 1335, a reference signal transmitting manager 1340, a UE communicating manager 1345, or any combination thereof. Each of these components may communicate, directly or indirectly, with one another (e.g., via one or more buses).

The communications manager 1320 may support wireless communication at a network entity in accordance with examples as disclosed herein. The downlink message transmitting manager 1325 may be configured as or otherwise support a means for transmitting, to a UE via a first serving cell, a message including an indication to activate a second serving cell different from the first serving cell. The control message transmitting manager 1330 may be configured as or otherwise support a means for transmitting, to the UE via the first serving cell, a control message indicating a first resource for transmitting a response message responsive to the message, and triggering a reference signal associated with time and frequency tracking for the second serving cell. The response message receiving manager 1335 may be configured as or otherwise support a means for receiving, from the UE via the first serving cell and within the first resource indicated via the control message, the response message acknowledging the message. The reference signal transmitting manager 1340 may be configured as or otherwise support a means for transmitting the reference signal to the UE within a second resource of the second serving cell based on the control message.

In some examples, the downlink message transmitting manager 1325 may be configured as or otherwise support a means for transmitting, via the message, an indication of a set of multiple candidate reference signal resources. In some examples, the control message transmitting manager 1330 may be configured as or otherwise support a means for transmitting, via the control message and based on the message, an indication of the second resource from the set of multiple candidate reference signal resources, where transmitting the reference signal within the second resource of the second serving cell is based on the indication of the second resource.

In some examples, the control message transmitting manager 1330 may be configured as or otherwise support a means for transmitting, via the control message, an indication of a time offset associated with the second resource for the reference signal, where transmitting the reference signal within the second resource is based on the time offset. In some examples, the time offset indicates a period of time between the first resource and the second resource.

In some examples, the control message transmitting manager 1330 may be configured as or otherwise support a means for transmitting, via the control message, an indication of the second resource for the reference signal, where transmitting the reference signal within the second resource is based on transmitting the indication of the second resource. In some examples, the control message includes a DCI message. In some examples, the control message includes an A-CSI request field that triggers the reference signal associated with time and frequency tracking for the second serving cell.

In some examples, the downlink message transmitting manager 1325 may be configured as or otherwise support a means for transmitting, via the message, the control message, or both, an indication of one or more parameters associated with the reference signal, where transmitting the reference signal within the second resource is based on the one or more parameters. In some examples, the one or more parameters include a structure of the reference signal, a component carrier for the reference signal, a BWP for the reference signal, or any combination thereof.

In some examples, the UE communicating manager 1345 may be configured as or otherwise support a means for communicating with the UE via the second serving cell based on time and frequency tracking information that is determined based on the reference signal.

In some examples, the reference signal transmitting manager 1340 may be configured as or otherwise support a means for transmitting, based on the reference signal, AGC information associated with the second serving cell, where communicating with the UE via the second serving cell is based on the AGC information.

In some examples, the reference signal is transmitted prior to an earliest SSB which the UE is capable of receiving via the second serving cell. In some examples, the reference signal includes a temporary reference signal, a tracking reference signal, an NZP-CSI-RS, or any combination thereof.

Figure 14:
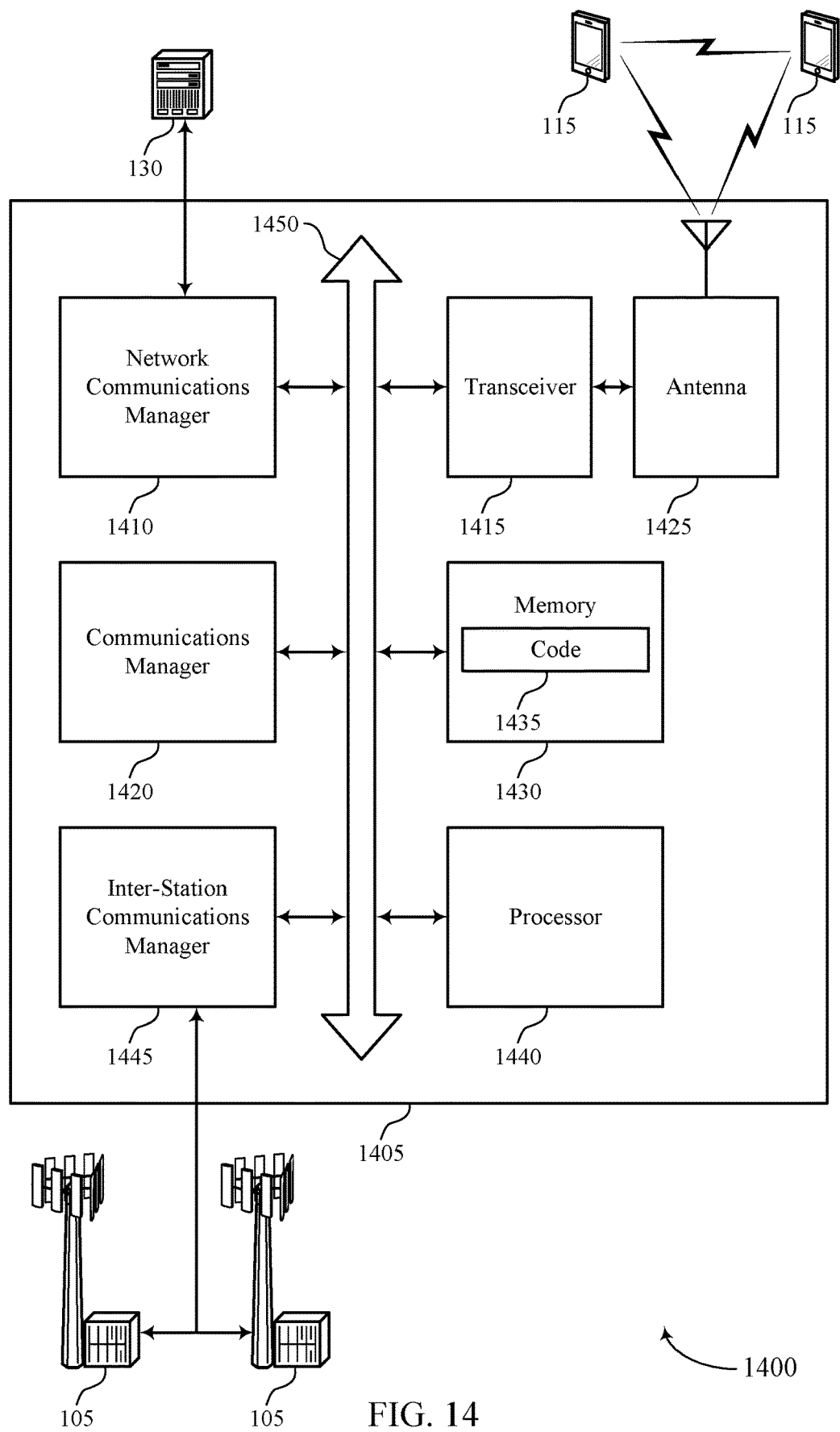
FIG. 14 shows a diagram of a system including a device that supports techniques for direct SCell activation using temporary reference signals in accordance with aspects of the present disclosure.

FIG. 14 shows a diagram of a system 1400 including a device 1405 that supports techniques for direct SCell activation using temporary reference signals in accordance with aspects of the present disclosure. The device 1405 may be an example of or include the components of a device 1105, a device 1205, or a network entity 105 as described herein. The device 1405 may communicate wirelessly with one or more network entities 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for direct SCell activation using temporary reference signals). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other network entities 105, and may include a controller or scheduler for controlling communications with UEs 115 in cooperation with other network entities 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for transmitting, to a UE via a first serving cell, a message including an indication to activate a second serving cell different from the first serving cell. The communications manager 1420 may be configured as or otherwise support a means for transmitting, to the UE via the first serving cell, a control message indicating a first resource for transmitting a response message responsive to the message, and triggering a reference signal associated with time and frequency tracking for the second serving cell. The communications manager 1420 may be configured as or otherwise support a means for receiving, from the UE via the first serving cell and within the first resource indicated via the control message, the response message acknowledging the message. The communications manager 1420 may be configured as or otherwise support a means for transmitting the reference signal to the UE within a second resource of the second serving cell based on the control message.

By including or configuring the communications manager 1420 in accordance with examples as described herein, the device 1405 may support techniques for improved wireless communications by improving direct SCell activation using RRC signaling (e.g., L3 signaling). In particular, techniques described herein may provide signaling and other configurations which enable the network to indicate sets of resources and other parameters for temporary reference signals used for SCell activation via RRC signaling. By enabling UEs 115 to identify resources for temporary reference signals using RRC signaling, techniques described herein may reduce a time required for SCell activation while reducing control signaling used for the SCell activation.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for direct SCell activation using temporary reference signals as described herein, or the processor 1440 and the memory 1430 may be otherwise configured to perform or support such operations.

Figure 15:
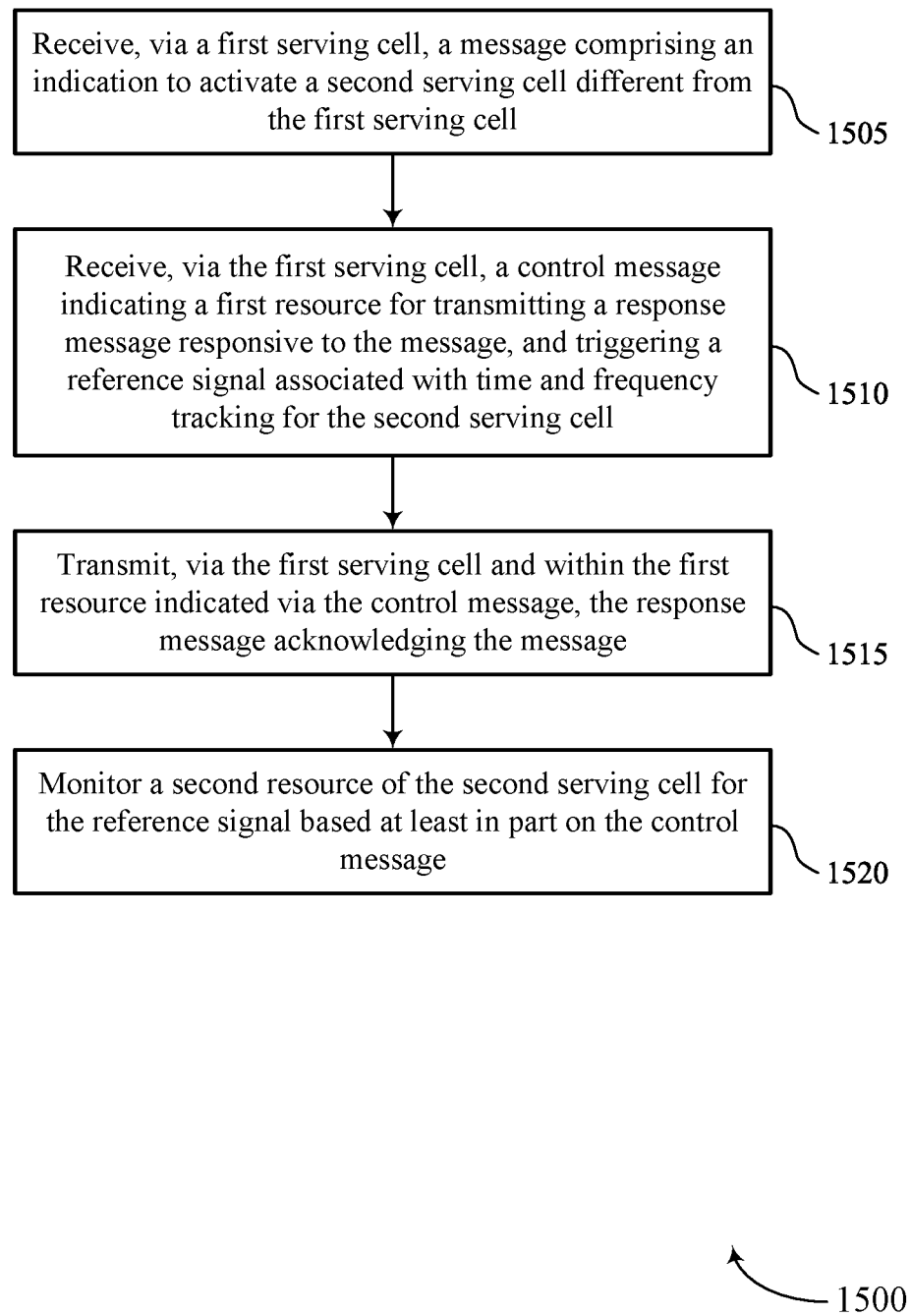
FIGS. 15 through 18 show flowcharts illustrating methods that support techniques for direct SCell activation using temporary reference signals in accordance with aspects of the present disclosure.

FIG. 15 shows a flowchart illustrating a method 1500 that supports techniques for direct SCell activation using temporary reference signals in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, via a first serving cell, a message including an indication to activate a second serving cell different from the first serving cell. The operations of 1505 may be performed in accordance with examples as disclosed herein. In some examples, aspects of the operations of 1505 may be performed by a downlink message receiving manager 925 as described with reference to FIG. 9.

At 1510, the method may include receiving, via the first serving cell, a control message indicating a first resource for transmitting a response message responsive to the message, and triggering a reference signal associated with time and frequency tracking for the second serving cell. The operations of 1510 may be performed in accordance with examples as disclosed herein. In some examples, aspects of the operations of 1510 may be performed by a control message receiving manager 930 as described with reference to FIG. 9.

At 1515, the method may include transmitting, via the first serving cell and within the first resource indicated via the control message, the response message acknowledging the message. The operations of 1515 may be performed in accordance with examples as disclosed herein. In some examples, aspects of the operations of 1515 may be performed by a response message transmitting manager 935 as described with reference to FIG. 9.

At 1520, the method may include monitoring a second resource of the second serving cell for the reference signal based on the control message. The operations of 1520 may be performed in accordance with examples as disclosed herein. In some examples, aspects of the operations of 1520 may be performed by a monitoring manager 940 as described with reference to FIG. 9.

Figure 16:
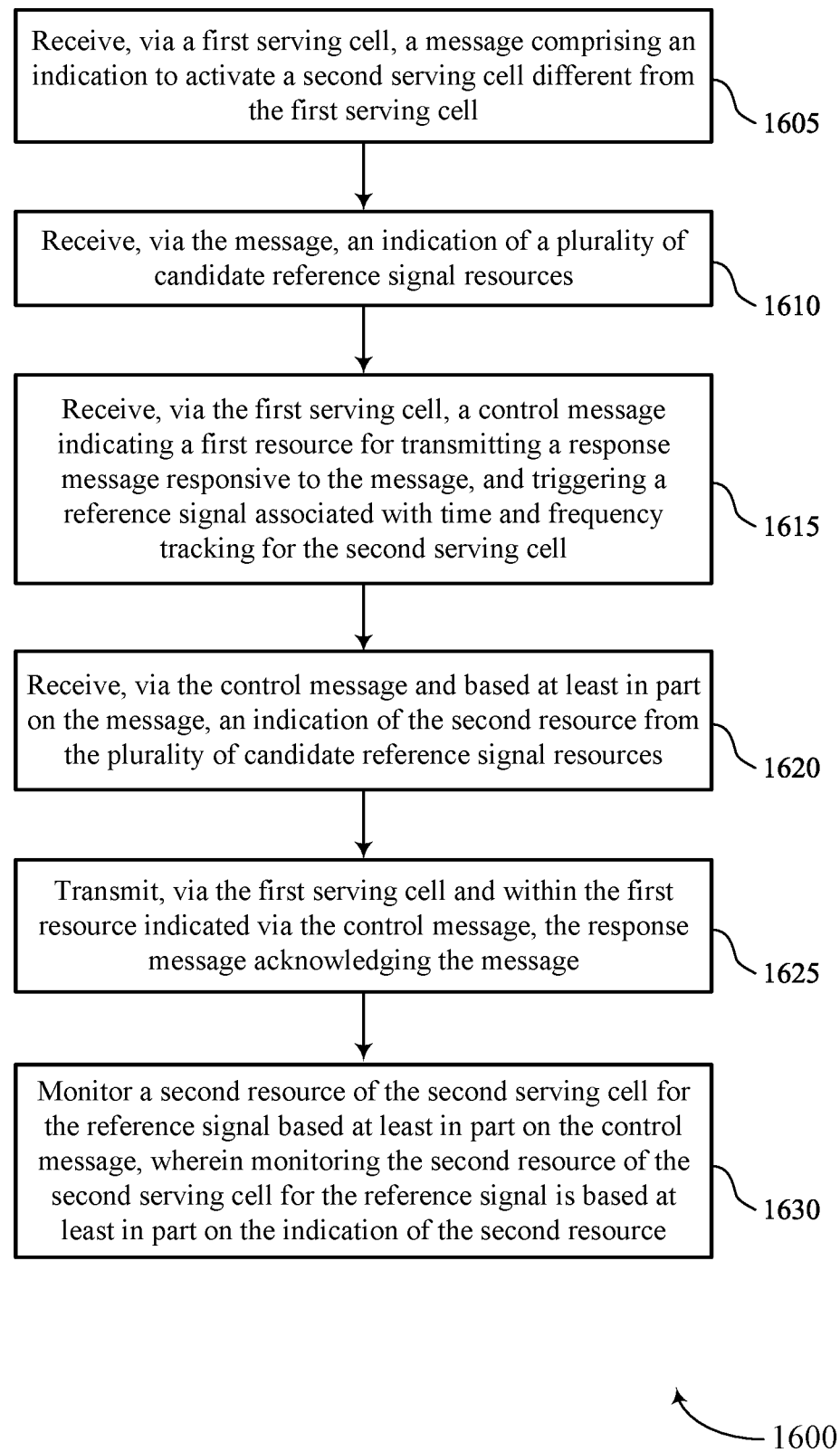

FIG. 16 shows a flowchart illustrating a method 1600 that supports techniques for direct SCell activation using temporary reference signals in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving, via a first serving cell, a message including an indication to activate a second serving cell different from the first serving cell. The operations of 1605 may be performed in accordance with examples as disclosed herein. In some examples, aspects of the operations of 1605 may be performed by a downlink message receiving manager 925 as described with reference to FIG. 9.

At 1610, the method may include receiving, via the message, an indication of a set of multiple candidate reference signal resources. The operations of 1610 may be performed in accordance with examples as disclosed herein. In some examples, aspects of the operations of 1610 may be performed by a downlink message receiving manager 925 as described with reference to FIG. 9.

At 1615, the method may include receiving, via the first serving cell, a control message indicating a first resource for transmitting a response message responsive to the message, and triggering a reference signal associated with time and frequency tracking for the second serving cell. The operations of 1615 may be performed in accordance with examples as disclosed herein. In some examples, aspects of the operations of 1615 may be performed by a control message receiving manager 930 as described with reference to FIG. 9.

At 1620, the method may include receiving, via the control message and based on the message, an indication of the second resource from the set of multiple candidate reference signal resources. The operations of 1620 may be performed in accordance with examples as disclosed herein. In some examples, aspects of the operations of 1620 may be performed by a control message receiving manager 930 as described with reference to FIG. 9.

At 1625, the method may include transmitting, via the first serving cell and within the first resource indicated via the control message, the response message acknowledging the message. The operations of 1625 may be performed in accordance with examples as disclosed herein. In some examples, aspects of the operations of 1625 may be performed by a response message transmitting manager 935 as described with reference to FIG. 9.

At 1630, the method may include monitoring a second resource of the second serving cell for the reference signal based on the control message, where monitoring the second resource of the second serving cell for the reference signal is based on the indication of the second resource. The operations of 1630 may be performed in accordance with examples as disclosed herein. In some examples, aspects of the operations of 1630 may be performed by a monitoring manager 940 as described with reference to FIG. 9.

Figure 17:
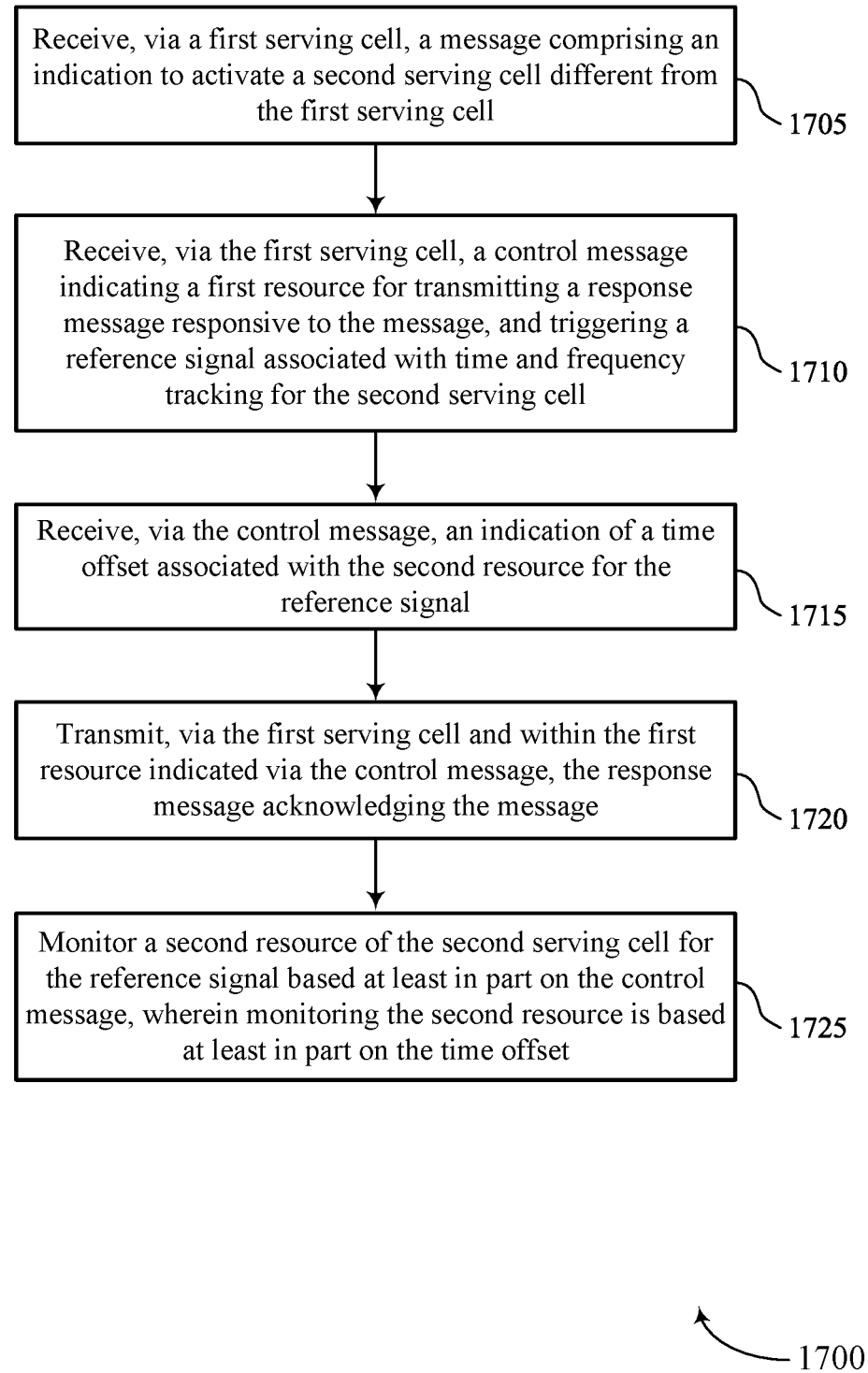

FIG. 17 shows a flowchart illustrating a method 1700 that supports techniques for direct SCell activation using temporary reference signals in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving, via a first serving cell, a message including an indication to activate a second serving cell different from the first serving cell. The operations of 1705 may be performed in accordance with examples as disclosed herein. In some examples, aspects of the operations of 1705 may be performed by a downlink message receiving manager 925 as described with reference to FIG. 9.

At 1710, the method may include receiving, via the first serving cell, a control message indicating a first resource for transmitting a response message responsive to the message, and triggering a reference signal associated with time and frequency tracking for the second serving cell. The operations of 1710 may be performed in accordance with examples as disclosed herein. In some examples, aspects of the operations of 1710 may be performed by a control message receiving manager 930 as described with reference to FIG. 9.

At 1715, the method may include receiving, via the control message, an indication of a time offset associated with the second resource for the reference signal. The operations of 1715 may be performed in accordance with examples as disclosed herein. In some examples, aspects of the operations of 1715 may be performed by a control message receiving manager 930 as described with reference to FIG. 9.

At 1720, the method may include transmitting, via the first serving cell and within the first resource indicated via the control message, the response message acknowledging the message. The operations of 1720 may be performed in accordance with examples as disclosed herein. In some examples, aspects of the operations of 1720 may be performed by a response message transmitting manager 935 as described with reference to FIG. 9.

At 1725, the method may include monitoring a second resource of the second serving cell for the reference signal based on the control message, where monitoring the second resource is based on the time offset. The operations of 1725 may be performed in accordance with examples as disclosed herein. In some examples, aspects of the operations of 1725 may be performed by a monitoring manager 940 as described with reference to FIG. 9.

Figure 18:
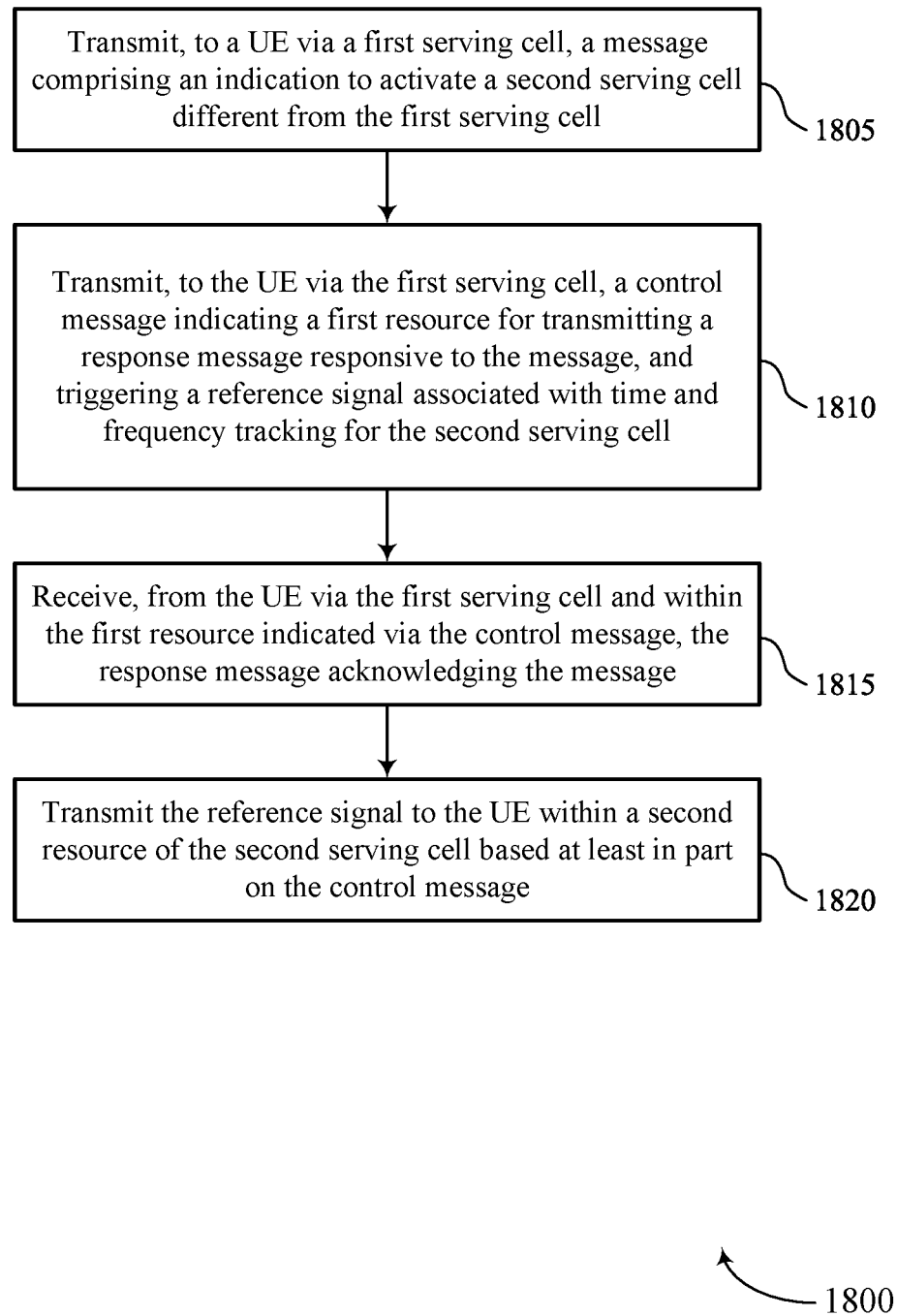

FIG. 18 shows a flowchart illustrating a method 1800 that supports techniques for direct SCell activation using temporary reference signals in accordance with aspects of the present disclosure. The operations of the method 1800 may be implemented by a network entity or its components as described herein. For example, the operations of the method 1800 may be performed by a network entity 105 as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, to a UE via a first serving cell, a message including an indication to activate a second serving cell different from the first serving cell. The operations of 1805 may be performed in accordance with examples as disclosed herein. In some examples, aspects of the operations of 1805 may be performed by a downlink message transmitting manager 1325 as described with reference to FIG. 13.

At 1810, the method may include transmitting, to the UE via the first serving cell, a control message indicating a first resource for transmitting a response message responsive to the message, and triggering a reference signal associated with time and frequency tracking for the second serving cell. The operations of 1810 may be performed in accordance with examples as disclosed herein. In some examples, aspects of the operations of 1810 may be performed by a control message transmitting manager 1330 as described with reference to FIG. 13.

At 1815, the method may include receiving, from the UE via the first serving cell and within the first resource indicated via the control message, the response message acknowledging the message. The operations of 1815 may be performed in accordance with examples as disclosed herein. In some examples, aspects of the operations of 1815 may be performed by a response message receiving manager 1335 as described with reference to FIG. 13.

At 1820, the method may include transmitting the reference signal to the UE within a second resource of the second serving cell based on the control message. The operations of 1820 may be performed in accordance with examples as disclosed herein. In some examples, aspects of the operations of 1820 may be performed by a reference signal transmitting manager 1340 as described with reference to FIG. 13.

Figure 19:
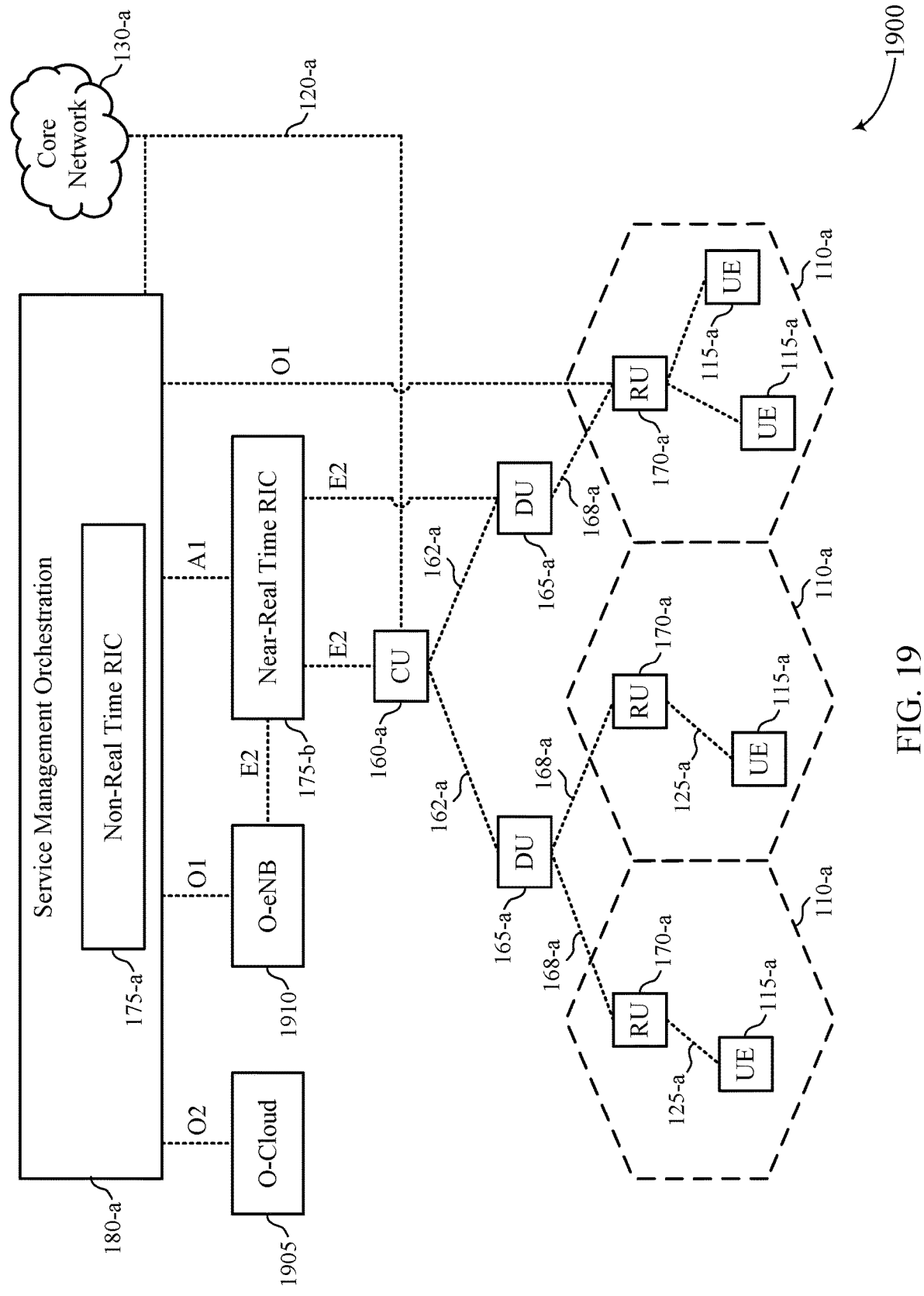
FIG. 19 illustrates an example of a network architecture that supports techniques for direct SCell activation using temporary reference signals in accordance with aspects of the present disclosure.

FIG. 19 illustrates an example of a network architecture 1900 (e.g., a disaggregated base station architecture, a disaggregated RAN architecture) that supports techniques for direct SCell activation using temporary reference signals in accordance with aspects of the present disclosure. The network architecture 1900 may illustrate an example for implementing one or more aspects of the wireless communications system 100. The network architecture 1900 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 1900 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 1905, Open eNBs (O-eNBs) 1910) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 1905) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 1910, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

The following provides an overview of aspects of the present disclosure:

Aspect 1: A method for wireless communication at a UE, comprising: receiving, via a first serving cell, a message comprising an indication to activate a second serving cell different from the first serving cell; receiving, via the first serving cell, a control message indicating a first resource for transmitting a response message responsive to the message, and triggering a reference signal associated with time and frequency tracking for the second serving cell; transmitting, via the first serving cell and within the first resource indicated via the control message, the response message acknowledging the message; and monitoring a second resource of the second serving cell for the reference signal based at least in part on the control message.

Aspect 2: The method of aspect 1, further comprising: receiving, via the message, an indication of a plurality of candidate reference signal resources; and receiving, via the control message and based at least in part on the message, an indication of the second resource from the plurality of candidate reference signal resources, wherein monitoring the second resource of the second serving cell for the reference signal is based at least in part on the indication of the second resource.

Aspect 3: The method of any of aspects 1 through 2, further comprising: receiving, via the control message, an indication of a time offset associated with the second resource for the reference signal, wherein monitoring the second resource is based at least in part on the time offset.

Aspect 4: The method of aspect 3, wherein the time offset indicates a period of time between the first resource and the second resource.

Aspect 5: The method of any of aspects 1 through 4, further comprising: receiving, via the control message, an indication of the second resource for the reference signal, wherein monitoring the second resource is based at least in part on receiving the indication of the second resource.

Aspect 6: The method of any of aspects 1 through 5, wherein the control message comprises a DCI message.

Aspect 7: The method of any of aspects 1 through 6, wherein the control message comprises an A-CSI request field that triggers the reference signal associated with time and frequency tracking for the second serving cell.

Aspect 8: The method of any of aspects 1 through 7, further comprising: receiving, via the message, the control message, or both, an indication of one or more parameters associated with the reference signal, wherein monitoring the second resource is based at least in part on the one or more parameters.

Aspect 9: The method of aspect 8, wherein the one or more parameters comprise a structure of the reference signal, a component carrier for the reference signal, a BWP for the reference signal, or any combination thereof.

Aspect 10: The method of any of aspects 1 through 9, further comprising: receiving the reference signal via the second serving cell based at least in part on the monitoring; and communicating with the second serving cell based at least in part on time and frequency tracking information determined using the reference signal.

Aspect 11: The method of aspect 10, further comprising: receiving, based at least in part on the reference signal, automatic gain control information associated with the second serving cell, wherein communicating with the second serving cell is based at least in part on the automatic gain control information.

Aspect 12: The method of any of aspects 10 through 11, wherein the reference signal is received prior to an earliest SSB which the UE is capable of receiving via the second serving cell.

Aspect 13: The method of any of aspects 1 through 12, wherein the reference signal comprises a temporary reference signal, a tracking reference signal, an NZP-CSI-RS, or any combination thereof.

Aspect 14: A method for wireless communication at a network entity, comprising: transmitting, to a UE via a first serving cell, a message comprising an indication to activate a second serving cell different from the first serving cell; transmitting, to the UE via the first serving cell, a control message indicating a first resource for transmitting a response message responsive to the message, and triggering a reference signal associated with time and frequency tracking for the second serving cell; receiving, from the UE via the first serving cell and within the first resource indicated via the control message, the response message acknowledging the message; and transmitting the reference signal to the UE within a second resource of the second serving cell based at least in part on the control message.

Aspect 15: The method of aspect 14, further comprising: transmitting, via the message, an indication of a plurality of candidate reference signal resources; and transmitting, via the control message and based at least in part on the message, an indication of the second resource from the plurality of candidate reference signal resources, wherein transmitting the reference signal within the second resource of the second serving cell is based at least in part on the indication of the second resource.

Aspect 16: The method of any of aspects 14 through 15, further comprising: transmitting, via the control message, an indication of a time offset associated with the second resource for the reference signal, wherein transmitting the reference signal within the second resource is based at least in part on the time offset.

Aspect 17: The method of aspect 16, wherein the time offset indicates a period of time between the first resource and the second resource.

Aspect 18: The method of any of aspects 14 through 17, further comprising: transmitting, via the control message, an indication of the second resource for the reference signal, wherein transmitting the reference signal within the second resource is based at least in part on transmitting the indication of the second resource.

Aspect 19: The method of any of aspects 14 through 18, wherein the control message comprises a DCI message.

Aspect 20: The method of any of aspects 14 through 19, wherein the control message comprises an A-CSI request field that triggers the reference signal associated with time and frequency tracking for the second serving cell.

Aspect 21: The method of any of aspects 14 through 20, further comprising: transmitting, via the message, the control message, or both, an indication of one or more parameters associated with the reference signal, wherein transmitting the reference signal within the second resource is based at least in part on the one or more parameters.

Aspect 22: The method of aspect 21, wherein the one or more parameters comprise a structure of the reference signal, a component carrier for the reference signal, a BWP for the reference signal, or any combination thereof.

Aspect 23: The method of any of aspects 14 through 22, further comprising: communicating with the UE via the second serving cell based at least in part on time and frequency tracking information that is determined based at least in part on the reference signal.

Aspect 24: The method of aspect 23, further comprising: transmitting, based at least in part on the reference signal, automatic gain control information associated with the second serving cell, wherein communicating with the UE via the second serving cell is based at least in part on the automatic gain control information.

Aspect 25: The method of any of aspects 23 through 24, wherein the reference signal is transmitted prior to an earliest SSB which the UE is capable of receiving via the second serving cell.

Aspect 26: The method of any of aspects 14 through 25, wherein the reference signal comprises a temporary reference signal, a tracking reference signal, an NZP-CSI-RS, or any combination thereof.

Aspect 27: An apparatus for wireless communication at a UE, comprising a processor; memory coupled with the processor; and instructions stored in the memory and executable by the processor to cause the apparatus to perform a method of any of aspects 1 through 13.

Aspect 28: An apparatus for wireless communication at a UE, comprising at least one means for performing a method of any of aspects 1 through 13.

Aspect 29: A non-transitory computer-readable medium storing code for wireless communication at a UE, the code comprising instructions executable by a processor to perform a method of any of aspects 1 through 13.

Aspect 30: An apparatus for wireless communication at a network entity, comprising a processor; memory coupled with the processor; and instructions stored in the memory and executable by the processor to cause the apparatus to perform a method of any of aspects 14 through 26.

Aspect 31: An apparatus for wireless communication at a network entity, comprising at least one means for performing a method of any of aspects 14 through 26.

Aspect 32: A non-transitory computer-readable medium storing code for wireless communication at a network entity, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   one or more memories coupled with the one or more processors; and
   instructions stored in the one or more memories and executable by the one or more processors to cause the apparatus to:
      receive, via a first serving cell, a message comprising an indication to activate a second serving cell different from the first serving cell;
      receive, via the first serving cell, a control message indicating a first resource for transmitting a response message responsive to the message, and triggering a reference signal associated with time and frequency tracking for the second serving cell;
      transmit, via the first serving cell and within the first resource indicated via the control message, the response message acknowledging the message;
      monitor a second resource of the second serving cell for the reference signal based at least in part on the control message;
      receive the reference signal via the second serving cell based at least in part on the second resource being monitored; and
      communicate with the second serving cell based at least in part on time and frequency tracking information determined using the reference signal.

2. The apparatus of claim 1, wherein the instructions are further executable by the one or more processors to cause the apparatus to:
   receive, via the message, an indication of a plurality of candidate reference signal resources; and
   receive, via the control message and based at least in part on the message, an indication of the second resource from the plurality of candidate reference signal resources, wherein monitoring the second resource of the second serving cell for the reference signal is based at least in part on the indication of the second resource.

3. The apparatus of claim 1, wherein the instructions are further executable by the one or more processors to cause the apparatus to:
   receive, via the control message, an indication of a time offset associated with the second resource for the reference signal, wherein monitoring the second resource is based at least in part on the time offset.

4. The apparatus of claim 3, wherein the time offset indicates a period of time between the first resource and the second resource.

5. The apparatus of claim 1, wherein the instructions are further executable by the one or more processors to cause the apparatus to:
   receive, via the control message, an indication of the second resource for the reference signal, wherein monitoring the second resource is based at least in part on receiving the indication of the second resource.

6. The apparatus of claim 1, wherein the control message comprises a downlink control information message.

7. The apparatus of claim 1, wherein the control message comprises an aperiodic channel state information request field that triggers the reference signal associated with time and frequency tracking for the second serving cell.

8. The apparatus of claim 1, wherein the instructions are further executable by the one or more processors to cause the apparatus to:
   receive, via the message, the control message, or both, an indication of one or more parameters associated with the reference signal, wherein monitoring the second resource is based at least in part on the one or more parameters.

9. The apparatus of claim 8, wherein the one or more parameters comprise a structure of the reference signal, a component carrier for the reference signal, a bandwidth part for the reference signal, or any combination thereof.

10. The apparatus of claim 1, wherein the instructions are further executable by the one or more processors to cause the apparatus to:
    receive, based at least in part on the reference signal, automatic gain control information associated with the second serving cell, wherein communicating with the second serving cell is based at least in part on the automatic gain control information.

11. The apparatus of claim 1, wherein the reference signal is received prior to an earliest synchronization signal block which the UE is capable of receiving via the second serving cell.

12. The apparatus of claim 1, wherein the reference signal comprises a temporary reference signal, a tracking reference signal, a non-zero power channel state information reference signal, or any combination thereof.

13. An apparatus for wireless communication at a network entity, comprising:
one or more processors;
one or more memories coupled with the one or more processors; and
instructions stored in the one or more memories and executable by the one or more processors to cause the apparatus to:
transmit, to a user equipment (UE) via a first serving cell, a message comprising an indication to activate a second serving cell different from the first serving cell;
transmit, to the UE via the first serving cell, a control message indicating a first resource for transmitting a response message responsive to the message, and triggering a reference signal associated with time and frequency tracking for the second serving cell;
receive, from the UE via the first serving cell and within the first resource indicated via the control message, the response message acknowledging the message;
transmit the reference signal to the UE within a second resource of the second serving cell based at least in part on the control message; and
communicate with the UE via the second serving cell based at least in part on time and frequency tracking information that is based at least in part on the reference signal.

14. The apparatus of claim 13, wherein the instructions are further executable by the one or more processors to cause the apparatus to:
transmit, via the message, an indication of a plurality of candidate reference signal resources; and
transmit, via the control message and based at least in part on the message, an indication of the second resource from the plurality of candidate reference signal resources, wherein transmitting the reference signal within the second resource of the second serving cell is based at least in part on the indication of the second resource.

15. The apparatus of claim 13, wherein the instructions are further executable by the one or more processors to cause the apparatus to:
transmit, via the control message, an indication of a time offset associated with the second resource for the reference signal, wherein transmitting the reference signal within the second resource is based at least in part on the time offset.

16. The apparatus of claim 15, wherein the time offset indicates a period of time between the first resource and the second resource.

17. The apparatus of claim 13, wherein the instructions are further executable by the one or more processors to cause the apparatus to:
transmit, via the control message, an indication of the second resource for the reference signal, wherein transmitting the reference signal within the second resource is based at least in part on transmitting the indication of the second resource.

18. The apparatus of claim 13, wherein the control message comprises a downlink control information message.

19. The apparatus of claim 13, wherein the control message comprises an aperiodic channel state information request field that triggers the reference signal associated with time and frequency tracking for the second serving cell.

20. The apparatus of claim 13, wherein the instructions are further executable by the one or more processors to cause the apparatus to:
transmit, via the message, the control message, or both, an indication of one or more parameters associated with the reference signal, wherein transmitting the reference signal within the second resource is based at least in part on the one or more parameters.

21. The apparatus of claim 20, wherein the one or more parameters comprise a structure of the reference signal, a component carrier for the reference signal, a bandwidth part for the reference signal, or any combination thereof.

22. The apparatus of claim 15, wherein the instructions are further executable by the one or more processors to cause the apparatus to:
transmit, based at least in part on the reference signal, automatic gain control information associated with the second serving cell, wherein communicating with the UE via the second serving cell is based at least in part on the automatic gain control information.

23. The apparatus of claim 15, wherein the reference signal is transmitted prior to an earliest synchronization signal block which the UE is capable of receiving via the second serving cell.

24. The apparatus of claim 13, wherein the reference signal comprises a temporary reference signal, a tracking reference signal, a non-zero power channel state information reference signal, or any combination thereof.

25. A method for wireless communication at a user equipment (UE), comprising:
receiving, via a first serving cell, a message comprising an indication to activate a second serving cell different from the first serving cell;
receiving, via the first serving cell, a control message indicating a first resource for transmitting a response message responsive to the message, and triggering a reference signal associated with time and frequency tracking for the second serving cell;
transmitting, via the first serving cell and within the first resource indicated via the control message, the response message acknowledging the message;
monitoring a second resource of the second serving cell for the reference signal based at least in part on the control message;
receiving the reference signal via the second serving cell based at least in part on monitoring the second resource; and
communicating with the second serving cell based at least in part on time and frequency tracking information determined using the reference signal.

26. The method of claim 25, further comprising:
receiving, via the message, an indication of a plurality of candidate reference signal resources; and
receiving, via the control message and based at least in part on the message, an indication of the second resource from the plurality of candidate reference signal resources, wherein monitoring the second resource of the second serving cell for the reference signal is based at least in part on the indication of the second resource.

27. A method for wireless communication at a network entity, comprising:
transmitting, to a user equipment (UE) via a first serving cell, a message comprising an indication to activate a second serving cell different from the first serving cell;
transmitting, to the UE via the first serving cell, a control message indicating a first resource for transmitting a response message responsive to the message, and triggering a reference signal associated with time and frequency tracking for the second serving cell;

receiving, from the UE via the first serving cell and within the first resource indicated via the control message, the response message acknowledging the message;

transmitting the reference signal to the UE within a second resource of the second serving cell based at least in part on the control message; and communicating with the UE via the second serving cell based at least in part on time and frequency tracking information that is based at least in part on the reference signal.

28. The method of claim 27, further comprising:

transmitting, via the message, an indication of a plurality of candidate reference signal resources; and transmitting, via the control message and based at least in part on the message, an indication of the second resource from the plurality of candidate reference signal resources, wherein transmitting the reference signal within the second resource of the second serving cell is based at least in part on the indication of the second resource.

\* \* \* \* \*